United States Patent
Yonge

(10) Patent No.: US 8,444,385 B2
(45) Date of Patent: May 21, 2013

(54) PHASE ADJUSTMENT MECHANISM

(76) Inventor: Christopher F. Yonge, Santa Cruz, CA (US)

( * ) Notice: Subject to any disclaimer, the term of this patent is extended or adjusted under 35 U.S.C. 154(b) by 609 days.

(21) Appl. No.: 12/756,996

(22) Filed: Apr. 8, 2010

(65) Prior Publication Data

US 2010/0272571 A1  Oct. 28, 2010

Related U.S. Application Data

(60) Provisional application No. 61/214,391, filed on Apr. 23, 2009, provisional application No. 61/216,232, filed on May 14, 2009.

(51) Int. Cl.
*F01D 7/02* (2006.01)

(52) U.S. Cl.
USPC ........... 416/43; 416/151; 416/159; 416/168 R

(58) Field of Classification Search
USPC ............. 416/32, 43, 147, 151, 155, 159, 162, 416/168 R
See application file for complete search history.

(56) References Cited

U.S. PATENT DOCUMENTS

| | | | | |
|---|---|---|---|---|
| 3,994,180 A * | 11/1976 | Ackerman | ....................... | 474/56 |
| 4,239,977 A * | 12/1980 | Strutman | ......................... | 416/44 |
| 6,720,670 B2 * | 4/2004 | Makino et al. | .................. | 290/55 |
| 7,083,378 B2 * | 8/2006 | Hur | ................................ | 415/4.3 |

* cited by examiner

*Primary Examiner* — Igor Kershteyn
(74) *Attorney, Agent, or Firm* — Dentons US LLP

(57) ABSTRACT

A variable transmission is described having a transmission mechanism and a phase adjustment mechanism. The transmission mechanism has supports that are movable toward or away from one another to vary the effective size of an effective cog. The phase adjustment mechanism has a differential type gear arrangement that creates a phase change to adjust the transmission mechanism. Another configuration is described which includes a subassembly with a phase adjustment mechanism for adjusting the pitch of propellers. Counter-rotating elements to control relative gear phase or pitch are provided externally, internally, distally or proximally relative to the source of mechanical torque in various configurations.

19 Claims, 21 Drawing Sheets

PHASE ADJUSTMENT MECHANISM

CROSS-REFERENCE TO RELATED APPLICATIONS

This utility application claims priority to U.S. Provisional Patent Application No. 61/214,391, filed on Apr. 23, 2009 and U.S. Provisional Patent Application No. 61/216,232, filed on May 14, 2009 each of which is incorporated herein by reference in their entirety.

BACKGROUND OF THE INVENTION

1). Field of the Invention

This invention relates to a phase adjustment mechanism for a variable transmission.

2). Discussion of Related Art

A transmission system transfers power from a first shaft (or axle) to a second shaft (or axle) and allows for adjustment of the ratio of a rotational speed of the first shaft relative to the second shaft. A standard bicycle has a transmission with two sets of cogs of varying sizes connected by a roller chain. One or more derailleur shift systems move the chain laterally by increments so that cogs of varying relative sizes are connected, varying the ratio that the front driving cog rotates relative to the rear cog that is connected to the rear wheel.

Attempts have been made in the past to design a bicycle transmission that does not have a derailleur. A derailleur is a relatively complex and delicate mechanism that does not allow gear changing while stationary or at slow speeds. U.S. Pat. No. 724,449 describes a transmission having a plurality of supports that form an effective cog and the supports are adjustable relative to one another to vary the size of the effective cog. The system in the U.S. Pat. No. 724,449, however, has a mechanism for adjusting the support members relative to one another, but the mechanism is complex and would be impractical and expensive to make.

SUMMARY OF THE INVENTION

The invention provides a phase adjustment mechanism including first and second phase adjustor mounting pieces that are mounted to one another for adjustment relative to one another about a central axis through an adjustment angle, a first phase adjustor connecting component and a first phase adjustor connecting member respectively mounted to the first and second phase adjustor mounting pieces for rotation respectively about a first phase adjustor component axis and a first phase adjustor connecting member axis that are different than the central axis, first, second and third phase adjustor rotational members connected such that a train is created sequentially by the first phase adjustor rotational member, the first phase adjustor connecting component, the second phase adjustor rotational member, the first phase adjustor connecting member and the third phase adjustor rotational member and such that the first and third phase adjustor rotational members revolve in an opposite direction than the second phase adjustor rotational member, the adjustment of the phase adjustor mounting pieces relative to one another through the adjustment angle causing a phase adjustment between the first and third phase adjustor rotational members.

The second phase adjustor mounting piece may extend through the second phase adjustor rotational member.

The phase adjustment mechanism may further include a plurality of phase adjustor connecting components, each being mounted to the first phase adjustor mounting piece.

Each phase adjustor component axis may intersect the central axis.

The phase adjustment mechanism may further include a plurality of phase adjustor connecting members, each being mounted to the second phase adjustor mounting piece for rotation about a respective phase adjustor connecting member axis, the phase adjustor connecting member axis being different from one another and different than the central axis.

Each phase adjustor connecting member axis may intersect the central axis.

Each phase adjustment mechanism may further include first phase adjustor component, first phase adjustor connecting member, and the first, second and third phase adjustor rotational members have meshing teeth, and may for example be gears.

The phase adjustment mechanism may further include a first phase adjustor component and a first phase adjustor connecting member having the same number of teeth.

The phase adjustment mechanism may further include a first, second and third phase adjustor rotational members that revolve about the central axis.

The phase adjustment mechanism may further include a third phase adjustor rotational member that forms part of a phase adjustor subsystem that rotates in the same direction as the first phase adjustor rotational member, the first phase adjustor rotational member and at least a portion of the phase adjustor subsystem being located to the left of the second phase adjustor rotational member.

The phase adjustment mechanism may further include first and third phase adjustor rotational members are that are located to the left of the second phase adjustor rotational member.

The phase adjustment mechanism may further include the first phase adjustor component and the first phase adjustor connecting member which may contact the same side of the second phase adjustor rotational member.

The phase adjustment mechanism may further include a phase adjustor shaft secured to the third phase adjustor rotational member, the second phase adjustor mounting piece being located on the phase adjustor shaft and rotatable on the phase adjustor shaft.

The phase adjustment mechanism may also include first and third phase adjustor rotational members that are on opposite sides of the second phase adjustor rotational member.

The phase adjustment mechanism may also include a first phase adjustor component and a first phase adjustor connecting member which contact opposite sides of the second phase adjustor rotational member.

The phase adjustment mechanism may also include a phase adjustor return shaft connected to the third phase adjustor rotational member and extending from the third phase adjustor rotational member through the second and first phase adjustor rotational members. The phase adjustment mechanism may also include a second phase adjustor mounting piece that is located on the phase adjustor return shaft and that is rotatable on the phase adjustor return shaft.

The invention further provides a variable transmission including, a transmission mechanism including a transmission mechanism mounting piece, a plurality of transmission mechanism adjustor pieces, each being mounted about a central axis to the transmission mechanism mounting piece for rotation about a respective transmission mechanism adjustor piece axis and each having an outer edge defining an arc about a respective transmission mechanism adjustor piece axis, a plurality of eccentric transmission mechanism supports, each being mounted to a respective one of the transmission mechanism adjustor piece at a location that is offset from the respective transmission mechanism adjustor piece axis so that rotation of the respective transmission mechanism adjustor piece causes rotation of the transmission mechanism support toward the central axis, each transmission mechanism support having an outer surface for supporting a looped elongate member running over the surfaces of consecutive ones of the transmission mechanism supports, a phase adjustment mechanism including first and second phase adjustor mounting pieces that are mounted to one another for adjustment relative to one another about a central axis through an adjustment angle, a first phase adjustor connecting component and a first phase adjustor connecting member respectively mounted to the first and second phase adjustor mounting pieces for rotation respectively about a first phase adjustor component axis and a first phase adjustor connecting member axis that are different than the central axis, first, second and third phase adjustor rotational members connected such that a train is created sequentially by the first phase adjustor rotational member, the first phase adjustor connecting component, the second phase adjustor rotational member, the first phase adjustor connecting member and the third phase adjustor rotational member and such that the first and third phase adjustor rotational members revolve in an opposite direction than the second phase adjustor rotational member, the adjustment of the phase adjustor mounting pieces relative to one another through the adjustment angle causing a phase adjustment between the first and third phase adjustor rotational members, and a link member secured to the phase adjustment mechanism, the link member having surface contacting the outer edges of the transmission mechanism adjustor pieces and the phase adjustment mechanism being secured to the transmission mechanism mounting piece so that phase adjustment of the first phase adjustor rotational member relative to the third phase adjustor rotational member causes rotation of the transmission mechanism adjustor pieces relative to the transmission mechanism mounting piece.

The link member may include a ring and the surface of the link member may be an internal surface of the ring.

The link member may be a shaft member and the surface of the link member may be an outer surface of the shaft member.

The invention further provides an airplane assembly including a phase adjustment mechanism including first and second phase adjustor mounting pieces that are mounted to one another for adjustment relative to one another about a central axis through an adjustment angle, a first phase adjustor connecting component and a first phase adjustor connecting member respectively mounted to the first and second phase adjustor mounting pieces for rotation respectively about a first phase adjustor component axis and a first phase adjustor connecting member axis that are different than the central axis, first, second and third phase adjustor rotational members connected such that a train is created sequentially by the first phase adjustor rotational member, the first phase adjustor connecting component, the second phase adjustor rotational member, the first phase adjustor connecting member and the third phase adjustor rotational member and such that the first and third phase adjustor rotational members revolve in an opposite direction than the second phase adjustor rotational member, the adjustment of the phase adjustor mounting pieces relative to one another through the adjustment angle causing a phase adjustment between the first and third phase adjustor rotational members, and a propeller mechanism including a propeller mount that rotates about a central axis and at least one propeller mounted to the propeller mount for rotation together with the propeller mount about the central axis and relative to the propeller mount about an axis at right angles to the central axis, wherein the phase adjustment by the phase adjustment mechanism rotates the propeller relative to the propeller mount.

BRIEF DESCRIPTION OF THE DRAWINGS

The invention is further described by way of examples with reference to the accompanying drawings wherein.

DETAILED DESCRIPTION

Figure 1:
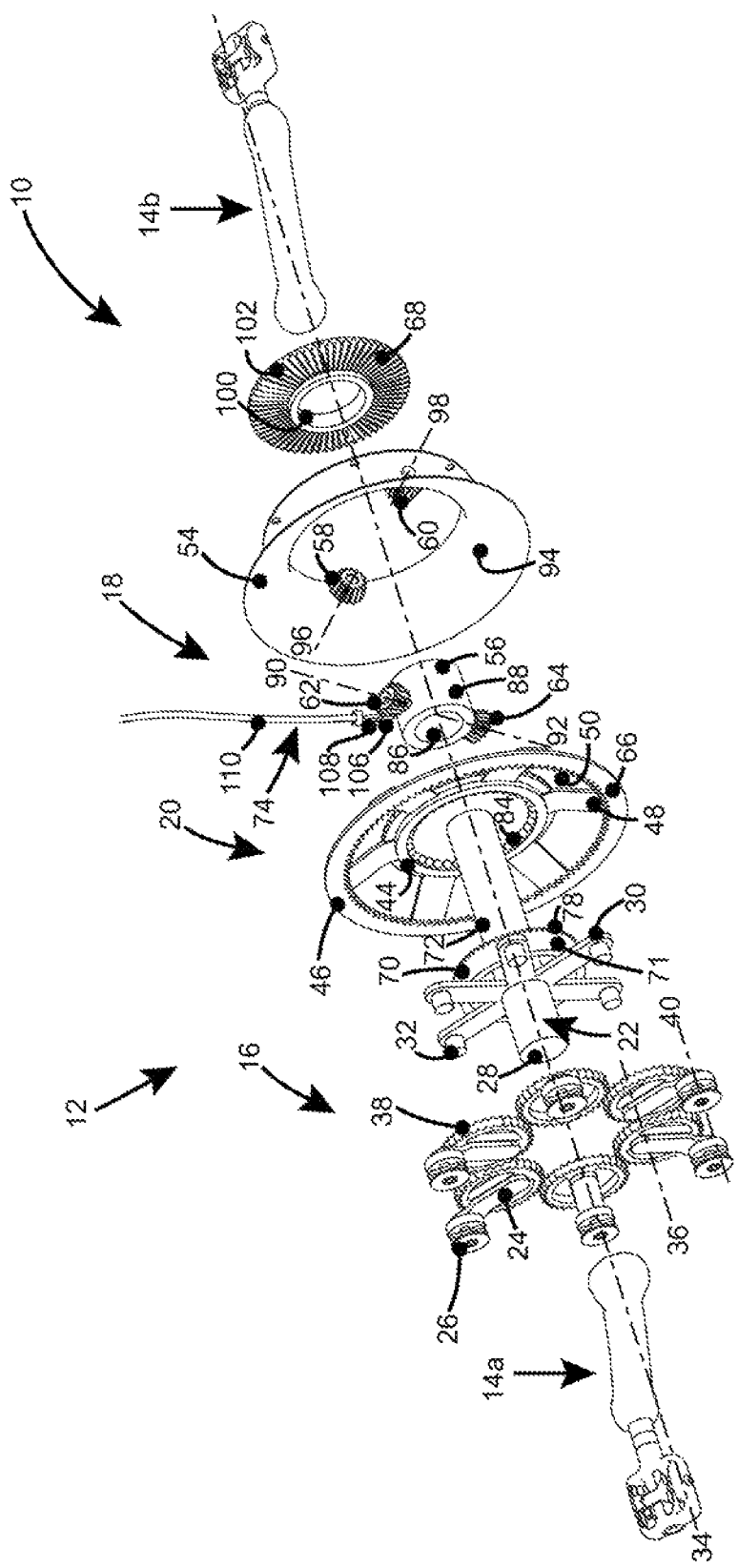
FIG. 1 is a perspective view from the left showing a bicycle sub-assembly in exploded form including a variable transmission having a phase adjustor assembly, according to a first embodiment of the invention.
Figure 2:
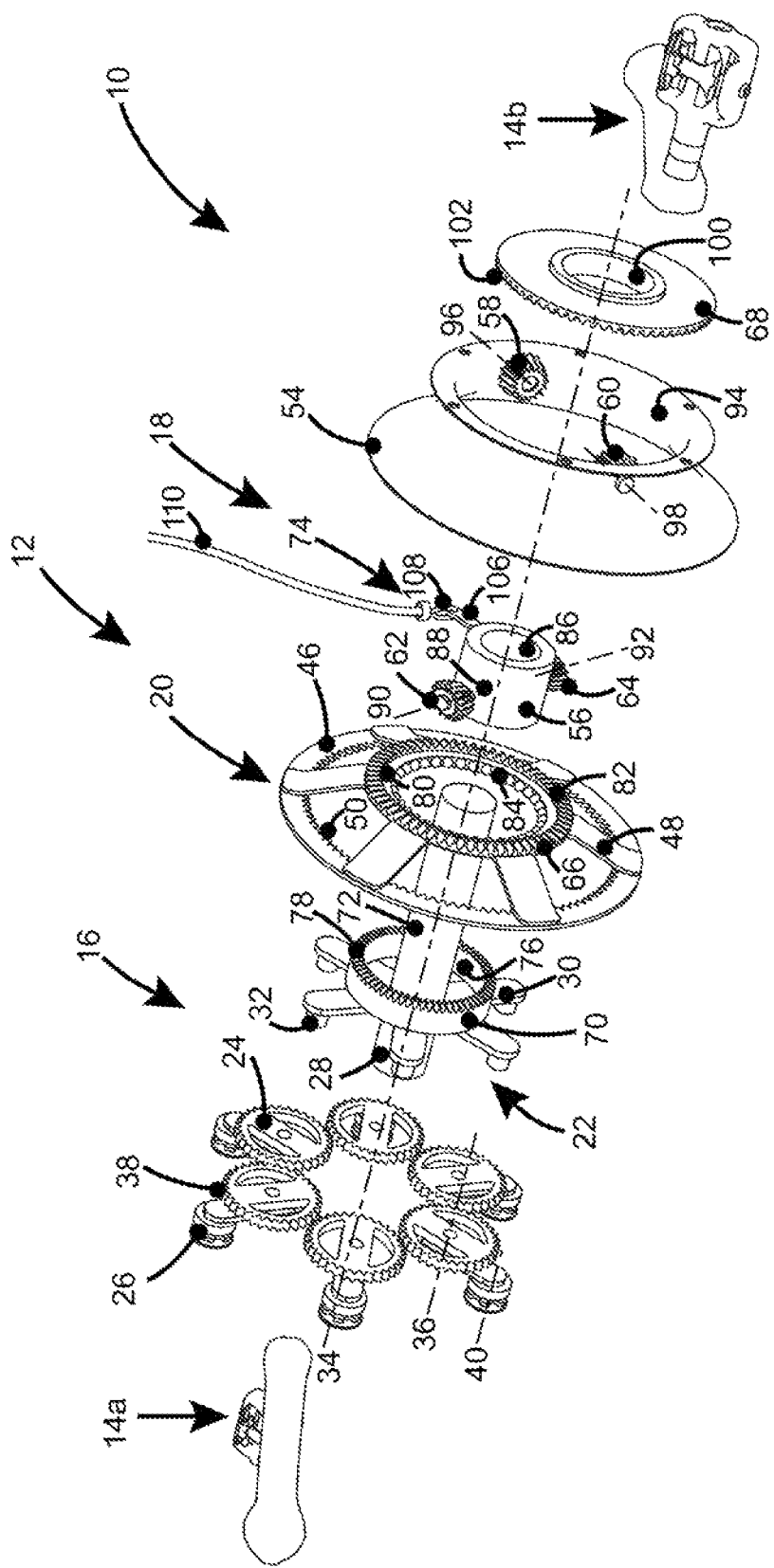
FIG. 2 is a perspective view from the right of the bicycle sub-assembly of FIG. 1.
Figure 3:
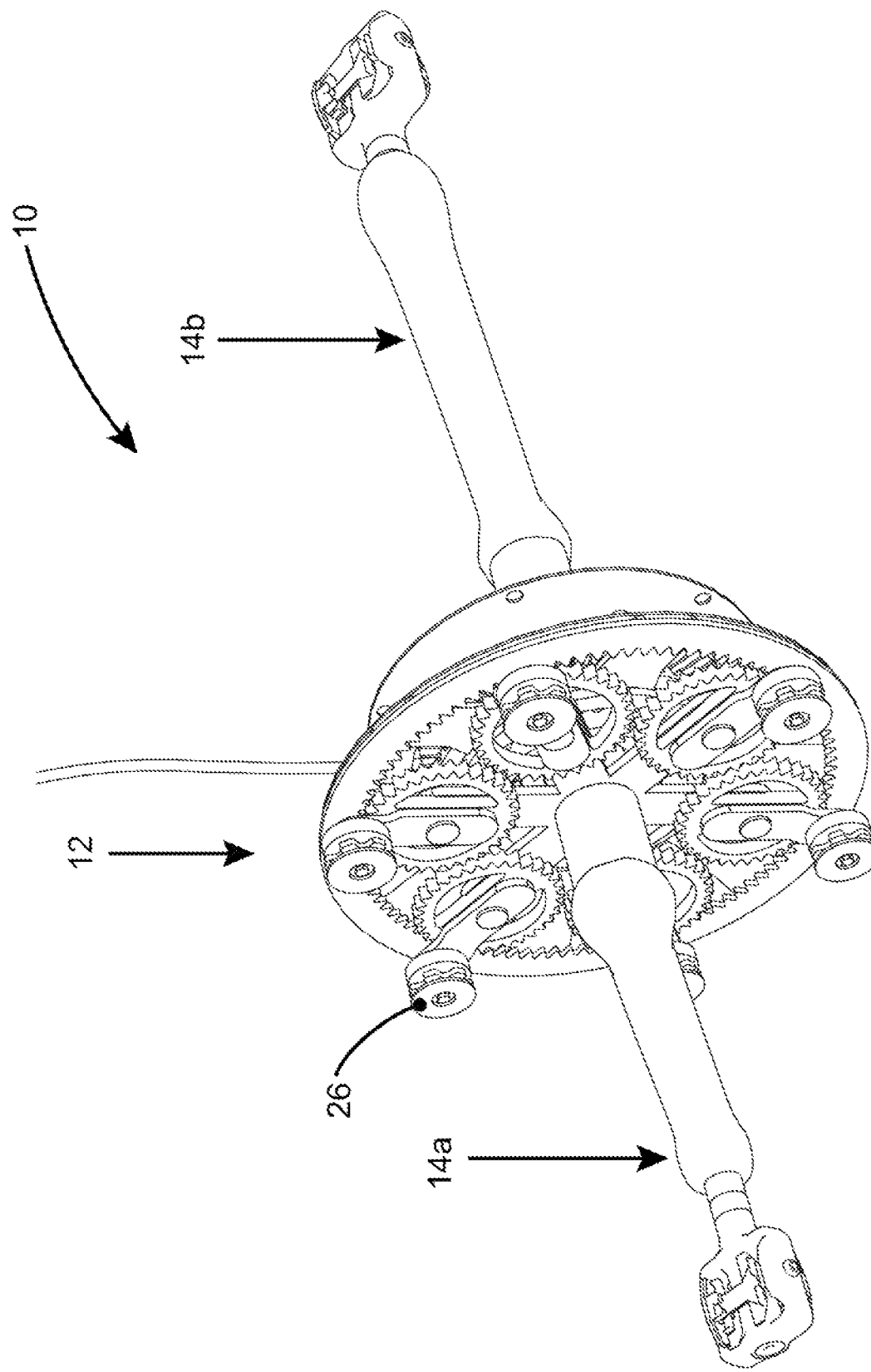
FIG. 3 is a perspective view from the right of the bicycle sub-assembly with the components thereof assembled to one another and showing transmission mechanism supports in positions to form a large effective cog.

FIGS. 1, 2 and 3 of the accompanying drawings illustrate a bicycle subassembly 10 including a variable transmission 12, and first and second pedal assemblies 14a and 14b respectively. The variable transmission includes a transmission mechanism 16, a phase adjustment mechanism 18 and a link member 20.

The transmission mechanism 16 includes a transmission mechanism mounting piece 22, six transmission mechanism adjustor pieces 24 and six transmission mechanism supports 26.

The transmission mechanism mounting piece 22 has a central pedal mount 28, six arms 30, and six mounting pins 32. The pedal mount 28 has a central axis 34. The arms 30 extend radially away from the pedal mount 28 and thus radially away from the central axis 34. Each one of the mounting pins 32 is located on a respective end of a respective one of the arms 30 and are located at 60 degree intervals around the central axis 34.

Each one of the transmission mechanism adjustor pieces 24 is mounted to a respective one of the mounting pins 32 and is rotatable about a respective transmission mechanism adjustor piece axis 36 parallel to the central axis 34. The transmission mechanism adjustor piece 24 has an outer edge 38 that forms a circular arc around the transmission mechanism adjustor piece axis 36. The outer edge 38 is toothed, so that the transmission mechanism adjustor piece 24 is a spur gear.

Each one of the transmission mechanism supports 26 is mounted to a respective one of the transmission mechanism adjustor pieces 24 and can rotate clockwise but not counter clockwise relative to the respective transmission mechanism adjustor piece 24 to which it is mounted. Each one of the transmission mechanism supports 26 has an outer surface for supporting a looped elongate member. In the present example, the outer surface is toothed to receive a bicycle chain 39. The outer surface has a transmission mechanism support axis 40 that is parallel to and offset from the respective transmission mechanism adjustor piece axis 36 so that rotation of the respective transmission mechanism adjustor piece 24 about the respective transmission mechanism adjustor piece axis 36 causes rotation of the respective transmission mechanism support axis 40 and the respective transmission mechanism support 26 about the respective transmission mechanism adjustor piece axis 36. A bicycle chain 39 at any moment in time contacts either four or five of the transmission mechanism supports 26.

Referring specifically to FIGS. 1 and 2, the link member 20 includes a central portion 44, an outer ring 46 and radial supports 48 connecting the outer ring 46 to the central portion 44. The outer ring 46 has an internal surface 50 that is brought into contact with the outer edges 38. The internal surface 50 is toothed so that the outer ring is an internal annular ring gear.

The phase adjustment mechanism 18 includes a first phase adjustor mounting piece 54, a second phase adjustor mounting piece 56, first and second phase adjustor connecting components 58 and 60, first and second phase adjustor connecting members 62 and 64, first, second and third phase adjustor rotational members 66, 68, and 70, a phase adjustor shaft 72, and a phase adjustor cable assembly 74.

The phase adjustor shaft 72 is connected to and can form an extension of the pedal mount 28 so that the phase adjustor shaft 72 has an axis corresponding to the central axis 34.

The third phase adjustor rotational member 70 is in the form of a ring having an internal surface 76. The third phase adjustor rotational member 70 is placed over an end of the phase adjustor shaft 72 and is secured to the transmission mechanism mounting piece 22 so that they rotate in unison. The third phase adjustor rotational member 70 has a rear surface 78 that is toothed, so that the third phase adjustor rotational member 70 is a bevel gear.

The first phase adjustor rotational member 66 is in the form of a ring having an internal surface 80 and is secured to the central portion 44. The first phase adjustor rotation member 66 has a rear surface 82 that is toothed, so that the first phase adjustor rotational member 66 is a bevel gear. A roller bearing 84 is secured to the central portion 44. The link member 20 together with the first phase adjustor rotational member 66 are placed over the phase adjustor shaft 72 and the roller bearing 84 is brought into contact with an outer surface 71 of the third phase adjustor rotational member 70. The roller bearing 84 aligns the link member 20 so that it can, if necessary, rotate about the central axis 34 relative to the third phase adjustor rotational member 70.

The second phase adjustor mounting piece 56 is in the form of a ring having an internal surface 86 and an external surface 88. The first and second connecting members 62 and 64 are mounted on opposing sides of the second phase adjustor mounting piece 56 and are rotatable about first and second phase adjustor connecting member axis 90 and 92, respectively, that coincide in this embodiment. The second phase adjustor mounting piece 56 is placed over the phase adjustor shaft 72. A sliding fit is provided between an outer surface of the phase adjustor shaft 72 and the internal surface 86. The second phase adjustor mounting piece 56 rotates about the central axis 34 by sliding on the phase adjustor shaft 72. Outer surfaces of the first and second phase adjustor connecting members 62 and 64 are toothed so that they are bevel gears. The toothed outer surfaces of the first and second phase adjustor connecting members 62 and 64 are placed in contact with the rear surface 78 so that the teeth of the first and second phase adjustor connecting members 62 and 64 mesh with the teeth of the rear surface 78. The first and second phase adjustor connecting member axis 90 and 92 are at right angles to and intersect the central axis 34 in this embodiment; in another embodiment the axis 90 and 92 may be at an angle other than at 90° relative to the central axis 34 and may be parallel to the central axis 34.

The first phase adjustor mounting piece 54 is in the form of a ring having an internal surface 94. The first and second phase adjustor connecting components 58 and 60 are secured to the first phase adjustor mounting piece 54 within the internal surface 94. The first and second phase adjustor connecting components 58 and 60 can rotate about first and second phase adjustor connecting component axis 96 and 98 respectively. The first and second phase adjustor connecting components 58 and 60 have outer surfaces that are toothed, so that the first and second phase adjustor connecting components are bevel gears. The first phase adjustor mounting piece 54 is placed over the second phase adjustor mounting piece 56 until the toothed outer surfaces of the first and second phase adjustor connecting components 58 and 60 come into contact with and mesh with the teeth of the rear surface 82. The first and second phase adjustor connecting component axis 96 and 98 are at right angles to and intersect the central axis 34, although they may be at an angle other than 90° relative to the central axis 34. The first and second phase adjustor connecting member axis 90 and 92 and the first and second phase adjustor connecting component axis 96 and 98 are all in the same plane in this embodiment.

The second phase adjustor rotational member 68 is in the form of a ring having an internal opening 100 and has a front surface 102 that is toothed so that the second phase adjustor rotational member 68 is a bevel gear. The front surface 102 has a wider track than the rear surfaces 78 or 82. The second phase adjustor rotational member 68 is placed over the second phase adjustor mounting piece 56 so that opposing ends of the second phase adjustor mounting piece 56 protrude from opposing sides of the second phase adjustor rotational member 68. Outer surfaces of the first and second phase adjustor connecting components 58 and 60 contact an outer region of the front surface 102. Outer surfaces of the first and second phase adjustor connecting members 62 and 64 contact an inner region of the front surface 102. A gear train is created sequentially by (i) the first phase adjustor rotational member 66, (ii) the first and second phase adjustor connecting components 58 and 60, (iii) the second phase adjustor rotational member 68, (iv) the first and second phase adjustor connecting members 62 and 64, and (v) the third phase adjustor rotational member 70.

The phase adjustor cable assembly 74 includes a phase adjustor lever arm 106, a phase adjustor cable 108, and a phase adjustor sheath 110. An end of the phase adjustor lever arm 106 is secured to an end of the second phase adjustor mounting piece 56 on a side of the second phase adjustor rotational member 68 opposing the first and second phase adjustor connecting members 62 and 64. The phase adjustor cable 108 is located within the phase adjustor sheath 110 and can slide up and down within the phase adjustor sheath 110 to alternately extend out of and retract into the phase adjustor sheath 110. An end of the phase adjustor cable 108 is attached to an end of the phase adjustor lever arm 106 distant from the central axis 34.

The assembled phase adjustment mechanism 18 is mounted to a frame of a bicycle. The first phase adjustor mounting piece 54 and the phase adjustor sheath 110 are mounted in a stationary position to a frame of the bicycle. The first pedal assembly 14a is secured to the pedal mount 28. The second pedal assembly 14b is secured to the pedal mount through the phase adjustor shaft 72.

In use, the first and second pedal assemblies 14a and 14b are rotated in a clockwise direction at a rotational speed of, for example, 100 rpm. The third phase adjustor rotational member 70 rotates together with the mounting piece 22 at 100 rpm in a clockwise direction. The second phase adjustor rotational member 68 rotates at 100 rpm in a counter clockwise direction because the first and second phase adjustor connecting members 62 and 64 reverse the direction of rotation from the third phase adjustor rotational member 70 to the second phase adjustor rotational member 68. The third and second phase adjustor rotational members 70 and 68, however, rotate at the same rotational speed because the first and second phase adjustor connecting members 62 and 64 do not normally revolve about the central axis 34.

The first phase adjustor rotational member 66 revolves in a clockwise direction at about 100 rpm because the first and second phase adjustor connecting components 58 and 60 reverse the direction of rotation from the second phase adjustor rotational member 68 to the first phase adjustor rotational member 66. The first phase adjustor mounting piece 54 does not rotate about the central axis 34, so that the first and second phase adjustor connecting components 58 and 60 do not revolve about the central axis 34. The rotational speeds of the second and third phase adjustor rotational members 68 and 70 are thus the same. The first and third phase adjustor rotational members 66 and 70 thus revolve together in a clockwise direction at 100 rpm.

In order to effect a phase change between the first and third phase adjustor rotational members 66 and 70, the phase adjustor cable 108 is extended out of the phase adjustor sheath 110, causing a rotation of the phase adjustor lever arm 106, the second phase adjustor mounting piece 56, and the first and second phase adjustor connecting members 62 and 64 about the central axis 34 relative to the phase adjustor shaft 72 and the first mounting piece 54 through an adjustment angle. As best envisioned when the second and third phase adjustor rotational members 68 and 70 are not revolving at 100 rpm, rotation of the first and second phase adjustor connecting members 62 and 64 counter clockwise through the adjustment angle causes rotation of the first phase adjustor rotational member 66 relative to the third phase adjustor rotational member 70 in a counter clockwise direction through an angle that equals two times the adjustment angle. The angular adjustment of the first phase adjustor rotational member 66 relative to the third phase adjustor rotational member will also occur when the first, second, and third phase adjustor rotational member 66, 68, and 70 are revolving about the central axis 34 at 100 rpm in their respective clockwise or counter clockwise directions. A phase adjustment between the first and third phase adjustor rotational members 66 and 70 is thus effected. The original phase relationship between the first and third phase adjustor rotational members 66 and 70 can be achieved by again retracting the phase adjustor cable 108 into the phase adjustor sheath 110.

Figure 4:
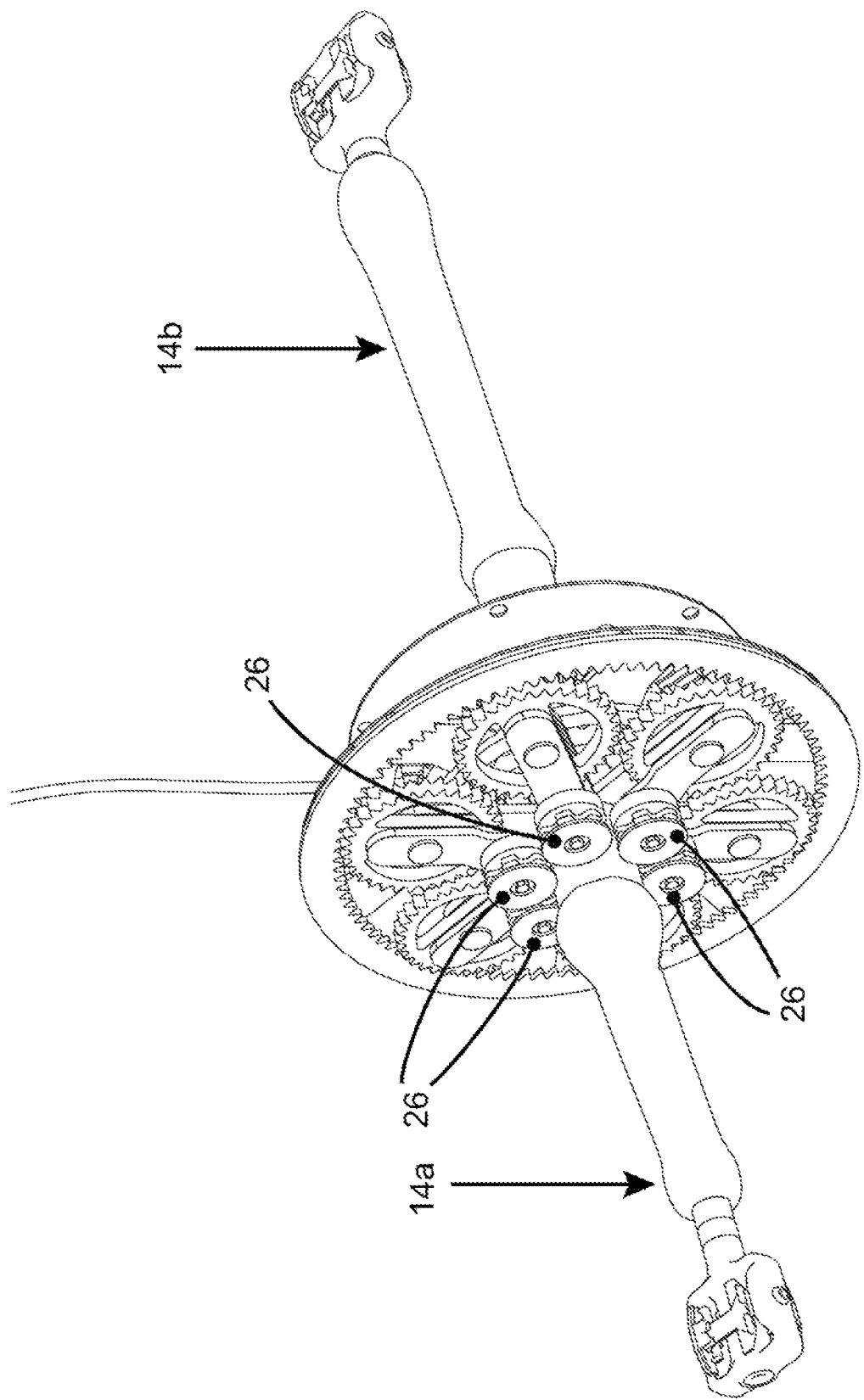
FIG. 4 is a view similar to FIG. 3 showing the transmission mechanism supports in a position to form a small effective cog.

During steady operation with the transmission mechanism supports 26 as shown in FIG. 3, the link member 20, the transmission mechanism mounting piece 22, and the transmission mechanism adjustor pieces 24 revolve about the central axis 34 at the rotational speed of pedaling, for example 100 rpm clockwise. An adjustment in phase between the link member 20 and the transmission mechanism mounting piece 22 causes rotation of the transmission mechanism adjustor pieces and the transmission mechanism supports about the respective transmission mechanism adjustor piece axis 36. The transmission mechanism supports 26 then rotate closer to the central axis 34 as shown in FIG. 4. The link member 20 and the transmission mechanism mounting piece 22 can then again rotate clockwise at the same rotational speed, for arguments sake 100 rpm. Rotation of the link member 20 and the transmission mechanism mounting piece 22 in a direction opposite to the direction that caused the phase change causes movement of the transmission mechanism supports 26 back into the position shown in FIG. 3.

The transmission mechanism supports 26 effectively form a cog for the bicycle chain 39. Another embodiment may make use of a belt or other looped flexible elongate member, in which case transmission mechanism supports provide an effective wheel for such an elongate member. As illustrated in FIG. 3, the effective diameter of the effective cog is relatively large. As illustrated in FIG. 4, rotation of the respective transmission mechanism adjustor pieces 24 rotate the transmission mechanism supports 26 closer to the central axis 34 and reduces the effective diameter of the effective cog. The ability for each transmission mechanism support 26 to rotate clockwise relative to a respective one of the transmission mechanism adjustor piece 24 to which it is mounted allows for the chain 39 to roll over the transmission mechanism supports 26 during adjustment between FIGS. 3 and 4.

The phase adjustment mechanism 18 of FIG. 1 is "reflective" in the sense that it allows for phase adjustment of the link member 20 and the transmission mechanism mounting piece 22 which are both located substantially in a common plane on a front (a left side in FIG. 1) of the phase adjustment mechanism 18. In the embodiment of FIG. 1, the reflective nature is accomplished by locating the first and third phase adjustor rotational members 66 and 70 on the same side to the left of the second phase adjustor rotational member 68. The phase adjustor shaft 72 does not transmit torque between the first, second and third phase adjustor rotational members 66, 68, or 70, and merely serves the purpose to align the second phase adjustor mounting piece 56 with the central axis 34 and to mount the second pedal assembly 14b.

Figure 5:
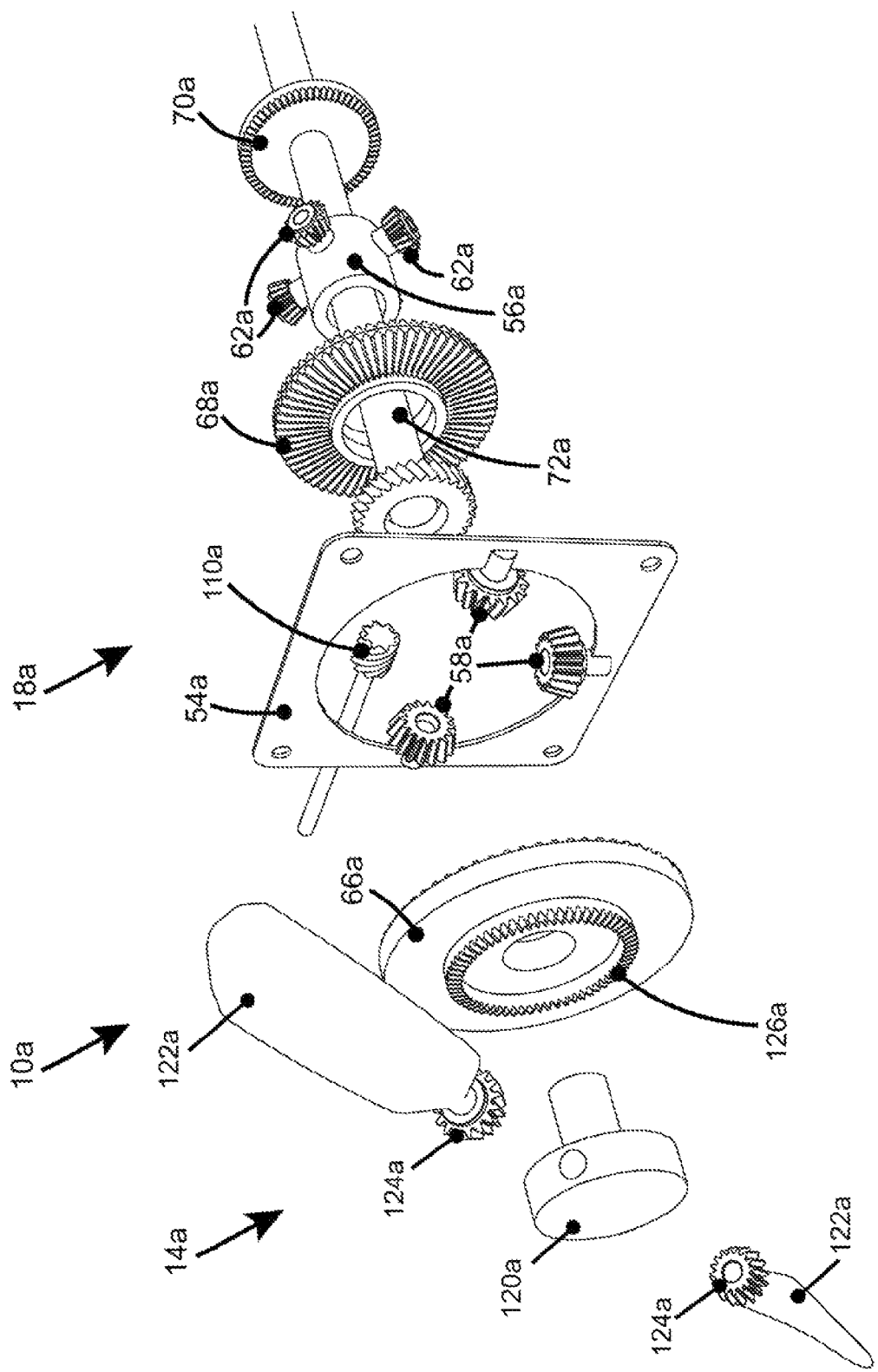
FIG. 5 is a perspective view from the left of an airplane subassembly including a propeller mechanism, components of a phase adjustment mechanism of a variable transmission, according to a second embodiment of the invention.
Figure 6:
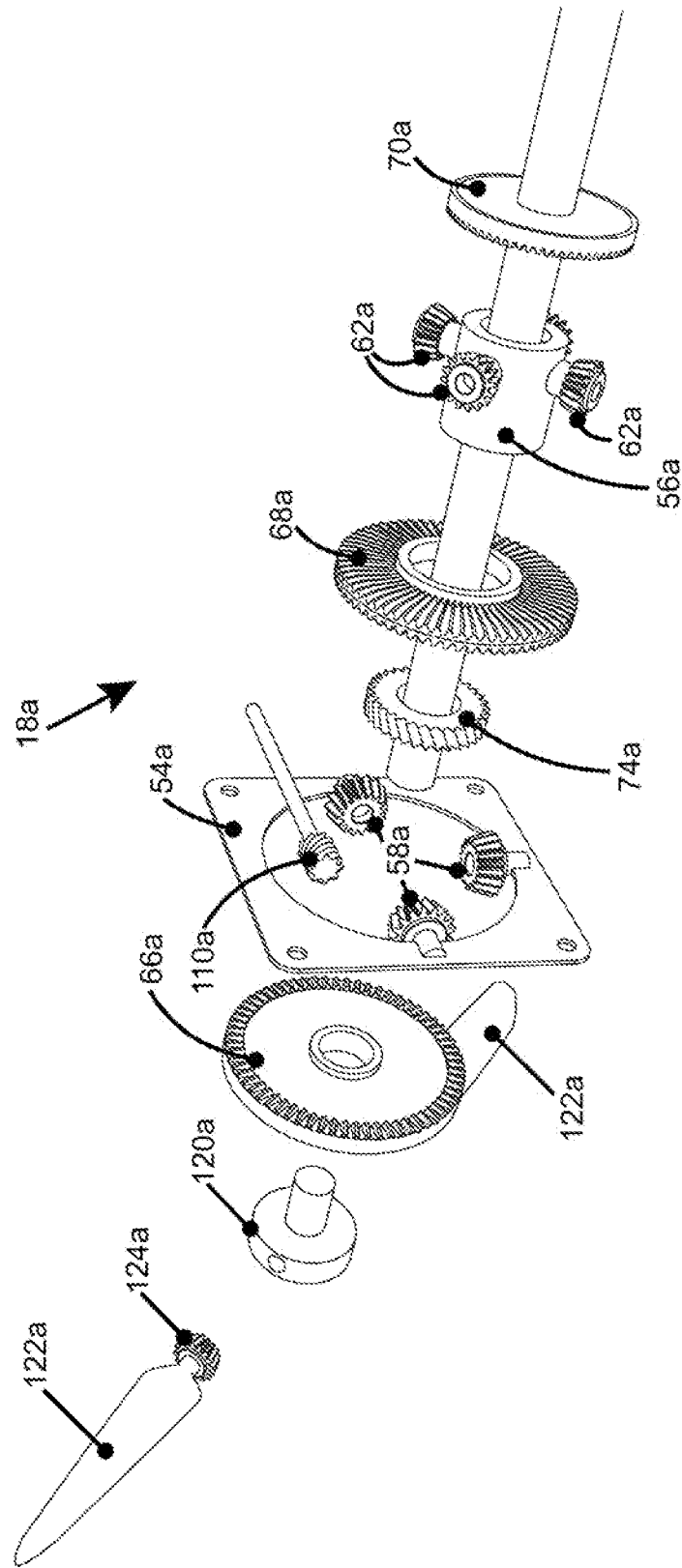
FIG. 6 is a perspective view from the right of the airplane subassembly of FIG. 5.

FIGS. 5 and 6 illustrate an airplane subassembly 10a including a propeller mechanism 14a and a phase adjustment mechanism 18a according to an alternative embodiment.

In the phase adjustment mechanism 18a, first and third phase adjustor rotational members 66a and 70a are located on opposite sides of a second phase adjustor rotational member 68a. A gear train is created sequentially by (i) the first phase adjustor rotational member 66a, (ii) four phase adjustor connecting components 58a, (iii) the second phase adjustor rotational member 68a, (iv) four phase adjustor connecting members 62a, and (v) the third phase adjustor rotational member 70a. The phase adjustor connecting components 58a are mounted to a stationary first phase adjustor mounting piece and the phase adjustor connecting members 62a are mounted to a rotatable second phase adjustor mounting piece 56a.

The third phase adjustor rotational member 70a is mounted on an adjustor return shaft 72a. The adjustor return shaft extends from the third phase adjustor rotational member 70a sequentially through the second phase adjustor mounting piece 56a, the second phase adjustor rotational member 68a, the first phase adjustor mounting piece 54a, and the first phase adjustor rotational member 66a. An end of the adjustor return shaft 72a and the first phase adjustor rotational member 66a are both located on a front or left side of the phase adjustment mechanism 18a with the remainder of the components of the phase adjustment mechanism 18a behind the first phase adjustor rotational member 66a to the right. The adjustor return shaft 72a thus provides the reflective nature of the phase adjustment mechanism 18a and transfers torque from the third phase adjustor rotational member 70a.

The second phase adjustor mounting piece 56a is inserted through an opening in the second phase adjustor rotational member 68a. A phase adjustor adjustment gear 74a is attached to the second phase adjustor mounting piece 56a and serves the same purpose as the phase adjustor cable assembly 74 of FIG. 1. A phase adjustor worm gear 110a meshes with the phase adjustor adjustment gear 74a, to cause adjustment thereof.

The propeller mechanism 14a includes a propeller mount 120a, two propellers 122a, two propeller mechanism pinion gears 124a and a propeller mechanism adjusting gear 126a. The propeller mount 120a is mounted to the adjustor return shaft 72a and the propeller mechanism adjusting gear 126a is mounted to the first phase adjustor rotational member 66a, so that the phase of the propeller mechanism adjusting gear 126a can be adjusted relative to the propeller mount 120a while the propeller mount 120a rotates together with the adjustor return shaft 72a. The propellers 122a are mounted to the propeller mount 120a. The propellers 122a can rotate about axis that are at right angles to and intersect a central axis about which the propeller mount 120a rotates. The propeller mechanism pinion gears 124a are non-rotatably secured to the propellers 120a and have teeth that mesh with teeth on the propeller mechanism adjusting gear 126a. Phase adjustment between the propeller mechanism adjusting gear 126a and the propeller mount 120a causes the propeller mechanisms pinion gears 124a to roll on propeller mechanism adjusting gear 126a, and thereby to adjust the pitch of the propellers 122a.

Figure 7:
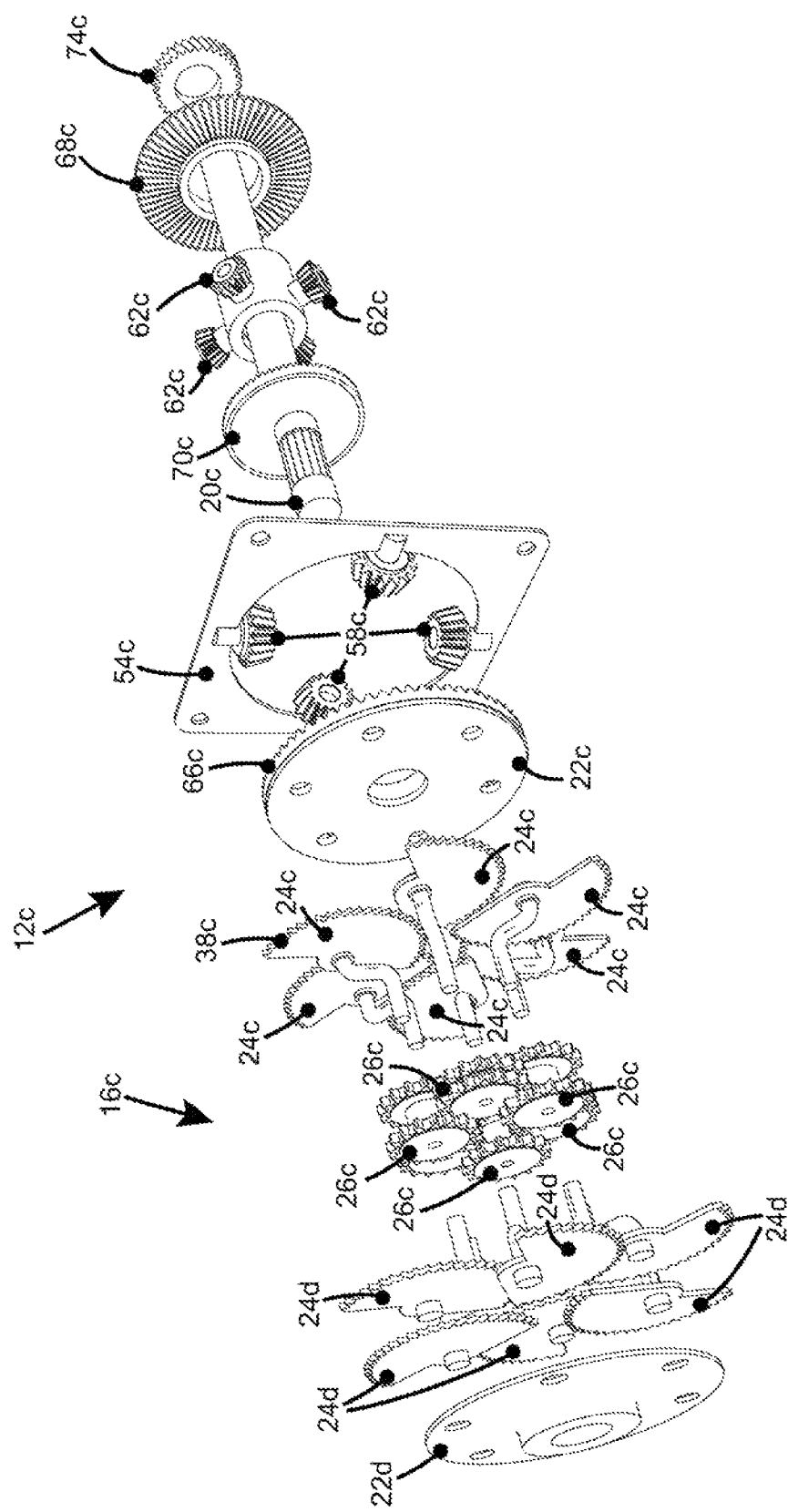
FIG. 7 is a perspective view from the left of components of a variable transmission according to a third embodiment of the invention.
Figure 8:
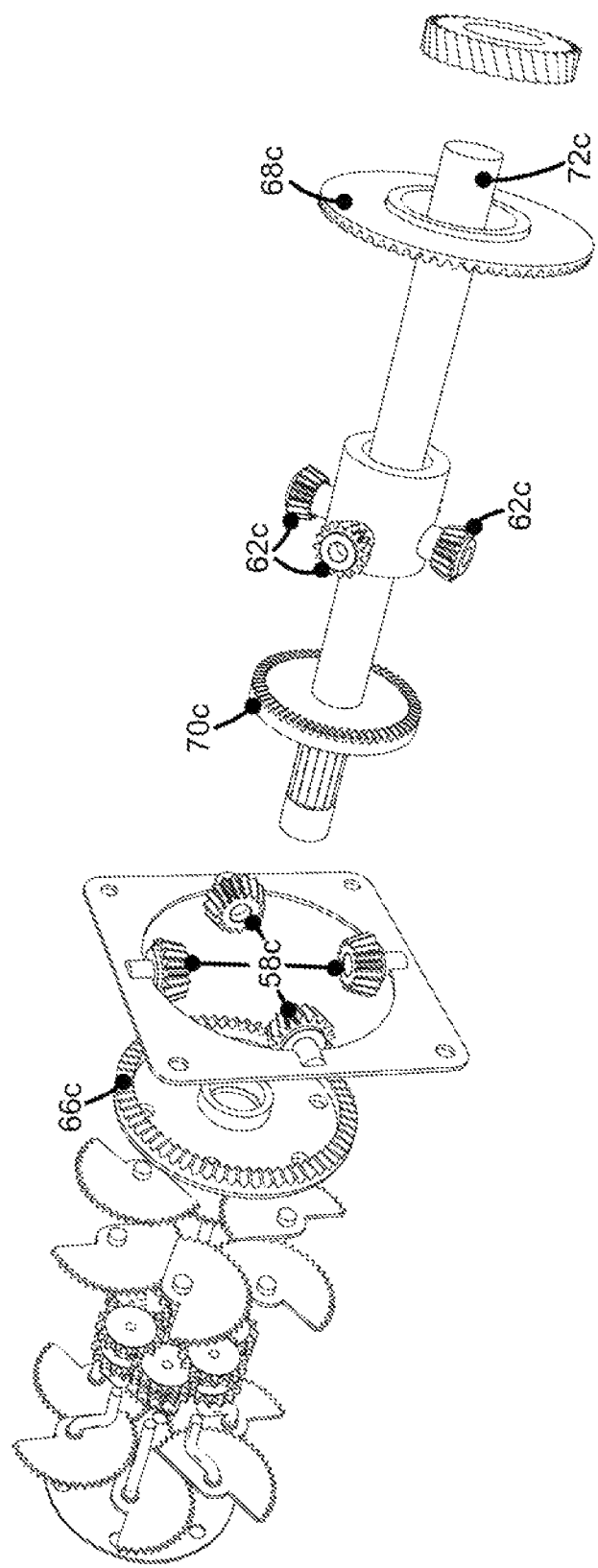
FIG. 8 is a perspective view from the right of the variable transmission of FIG. 7.

FIGS. 7 and 8 illustrate a variable transmission 12c that is more suitable for power applications than the variable transmission 12 of FIG. 1. The variable transmission 12c is similar to the variable transmission 12 of FIG. 1 and like components are indicated with like reference numerals that are appended with "c." Four phase adjustor connecting components 58c are provided instead of the two phase adjustor connecting components 58 and 60 of FIG. 1. Similarly, four phase adjustor connecting members 62c are provided instead of the two phase adjustor connecting members 62 and 64 of FIG. 1. A phase adjustor adjustment gear 74c is provided instead of the phase adjustor cable assembly of FIG. 1.

A transmission mechanism mounting piece 22c is secured to the first phase adjustor rotational member 66c. In contrast, in the embodiment of FIG. 1, the transmission mechanism mounting piece 22c is mounted to the third phase adjustor rotational member 70. In the embodiment of FIG. 7, a link member 20c is a shaft member to which the third phase adjustor rotational member 70c is mounted. In contrast, the embodiment of FIG. 1 has the link member 20 secured to the first phase adjustor rotational member 66. The link member 20c extends through an opening in the first phase adjustor rotational member 66c and the transmission mechanism mounting piece 22c. An outer surface of the link member 20c is splined or toothed and meshes with teeth on outer edges 38c of the six transmission mechanism adjustor pieces 24c. A phase adjustment between the link member 20c and the transmission mechanism mounting piece 22c causes rotation of the transmission mechanism adjustor pieces 24c relative to the transmission mechanism mounting piece 22c, and corresponding rotation of the transmission mechanism supports 26c relative to the transmission mechanism mounting piece 22c.

Six additional transmission mechanism adjustor pieces 24d are mounted to a transmission mechanism backing plate 22d. The transmission mechanism adjustor pieces 24d and 24c support the transmission mechanism supports 26c on opposing sides and are rotationally driven by the same link member 20c.

The reason why the variable transmission 12c of FIGS. 7 and 8 is more suitable for power transmission is because the link member 20c can be extended to the left to control further arrays of transmission mechanism supports and power chains, and in this way torque capability can be increased as needed.

FIGS. 9, 10, 11, and 12 of the accompanying drawings illustrate a second bicycle subassembly 10d including a variable transmission 12d, and first and second pedal assemblies 14a and 14b respectively. The variable transmission 12d includes a transmission mechanism 16d, and a phase adjustment mechanism 18d Referring now to FIGS. 10, 11, and 12 of the accompanying drawings, the transmission mechanism 16d includes a double transmission mechanism mounting ring 127a, 127b, six transmission mechanism adjustor pieces 24e, six transmission mechanism supports 26d, and six support arms 128; three of the six affixed to each mounting ring 127.

The transmission mechanism mounting ring 127 has three flanges directed inwards to be used in conjunction with mounting pins 32 in order to affix the mounting rings 126 together. Additionally the flanges on the rear mounting ring 126b mount a transmission mounted phase adjustment sun gear 130.

The transmission adjustor pieces 24e engage with a pair of fixed motor sun gears 132 on an axis 34 and serve to support the transmission mechanism 16d about the bicycle subassembly 10d in addition to a later disclosed purpose.

Each one of the transmission mechanism supports 26*d* has a toothed outer surface for supporting a looped elongate member. In the present example, the outer surface is toothed to receive a ladder chain, but could be adapted to receive a roller chain.

Figure 10:
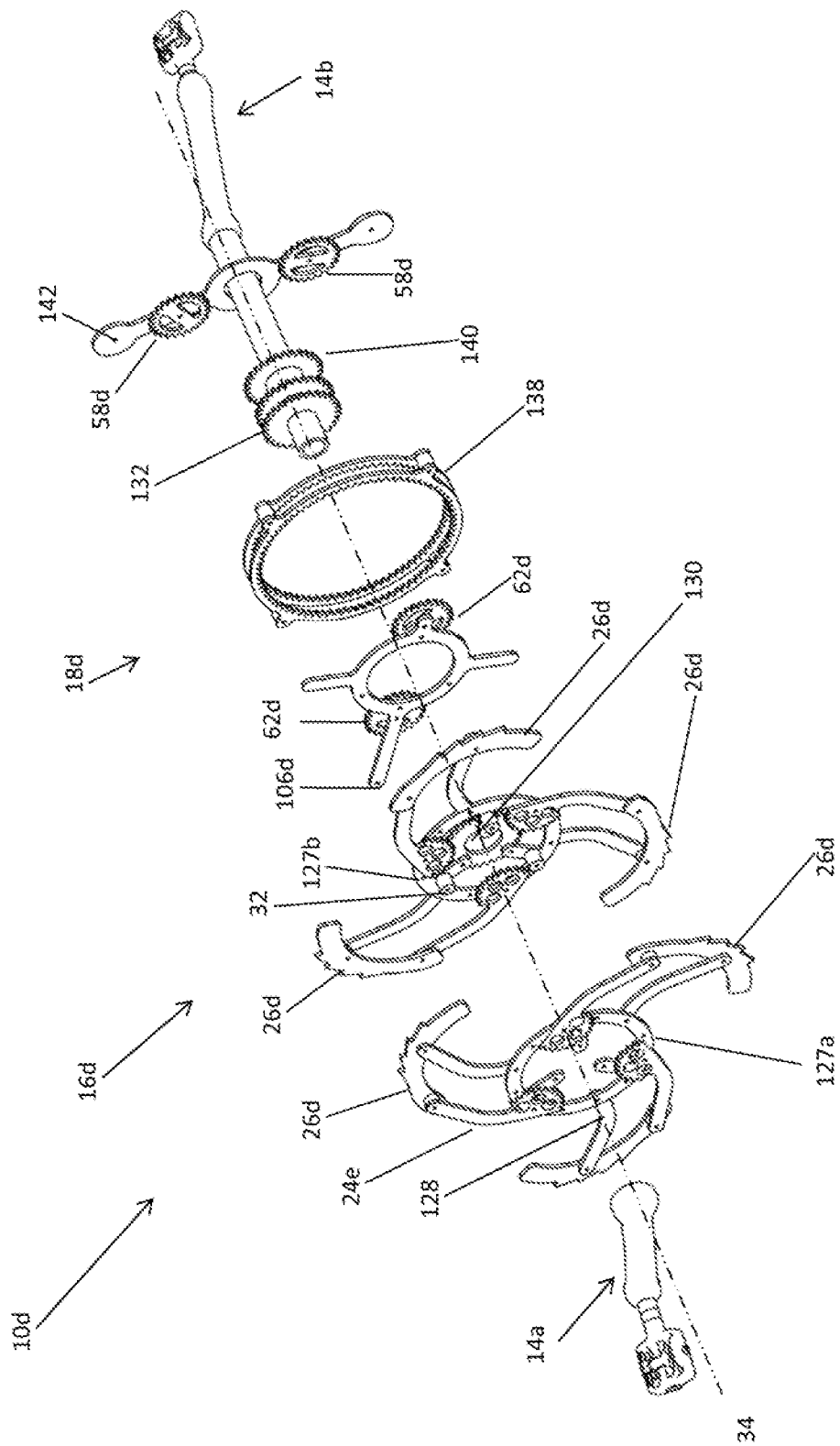
FIG. 10 is an exploded view from the left of the variable transmission of FIG. 9.
Figure 11:
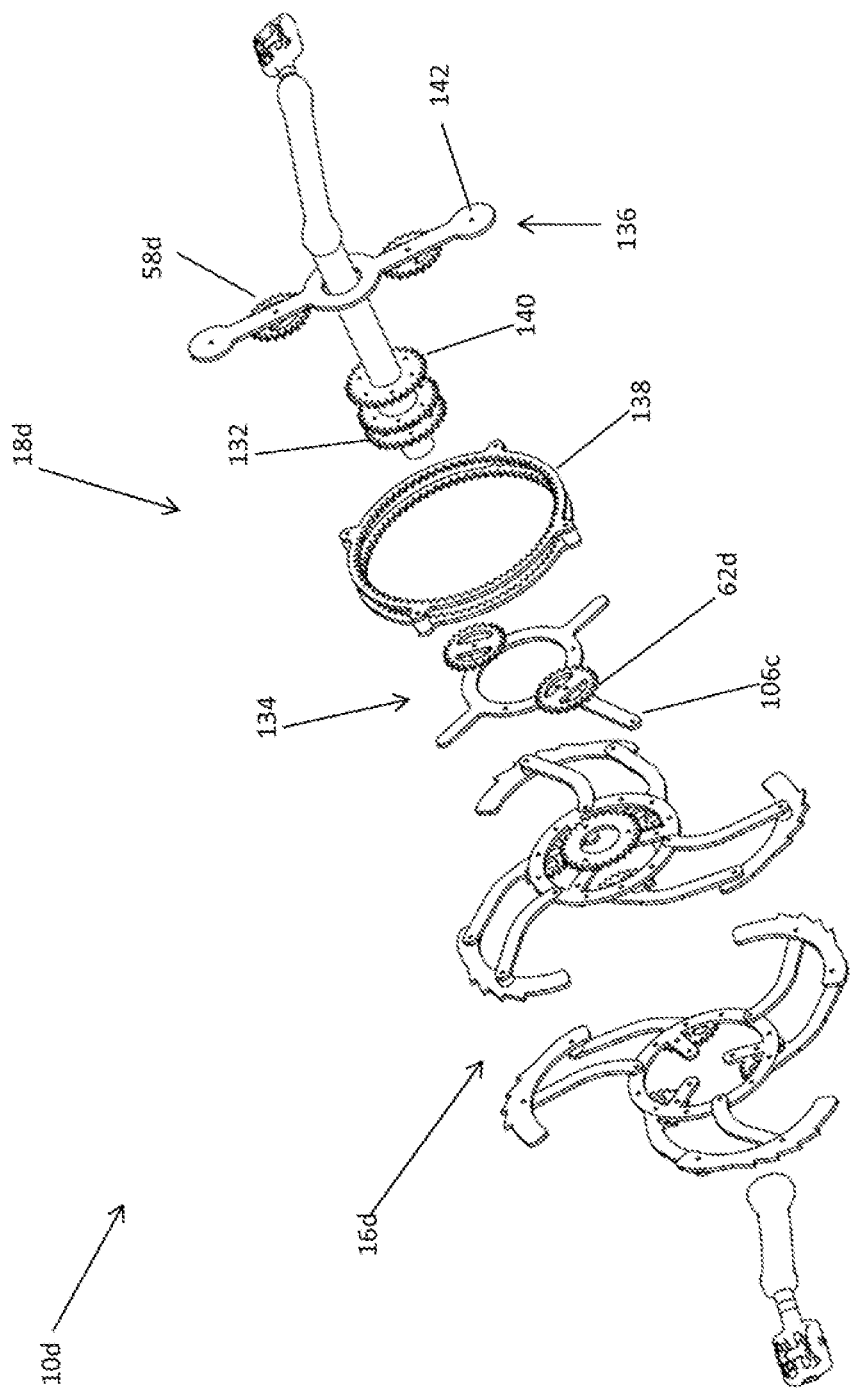
FIG. 11 is an exploded view from the right side of the variable transmission of FIG. 9.
Figure 12:
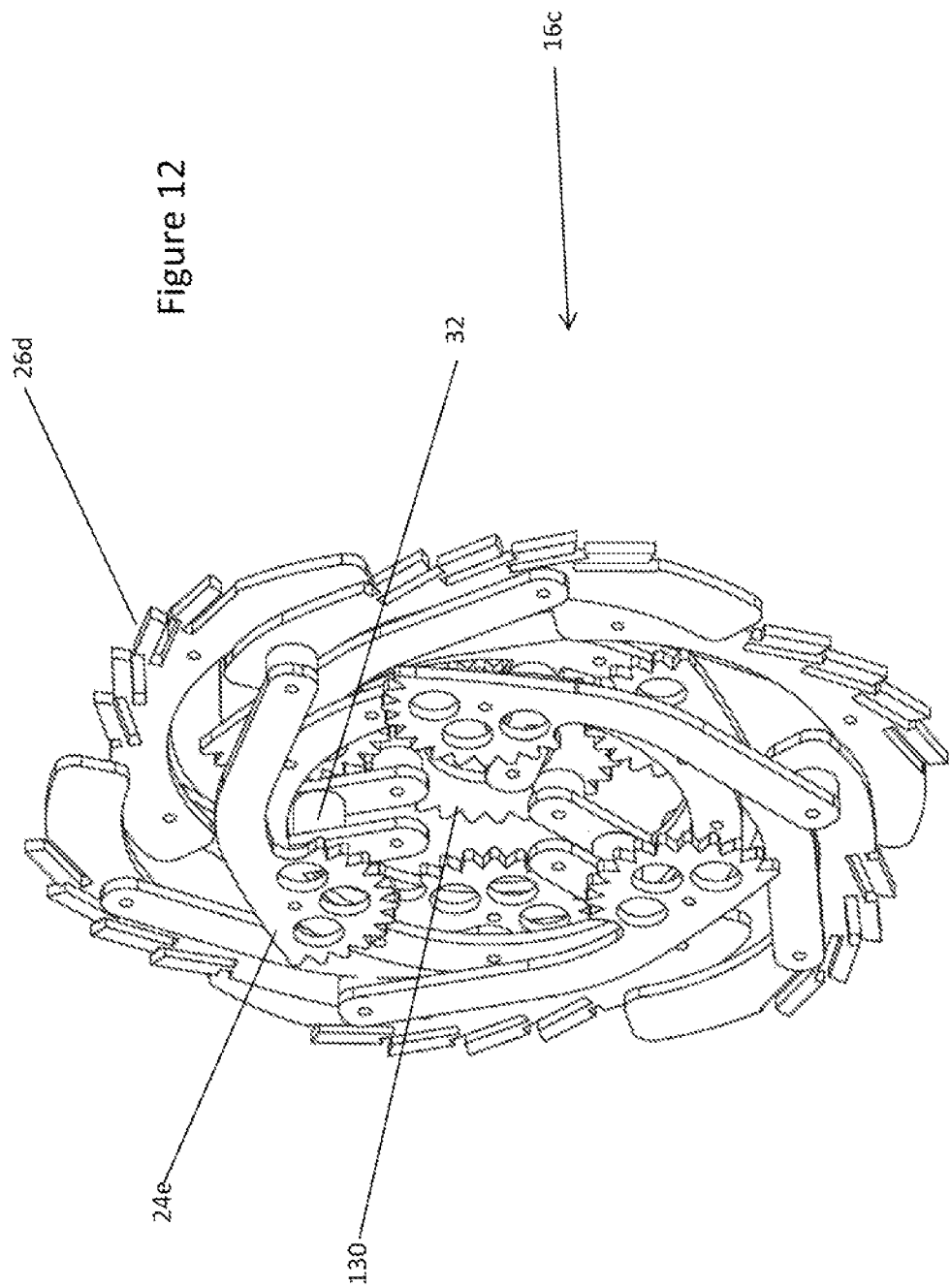
FIG. 12 is a perspective view from the left of a small effective cog of the variable transmission of FIG. 9.

Referring now to FIGS. 10 and 11 of the accompanying drawings, the phase adjustment mechanism 18*d* includes a mobile phase adjustor 134, a static phase adjustor 136, a counter-rotating double annular gear 138, and an axial mounted phase adjustment sun gear 140.

The mobile phase adjustor 134 includes two or more planet gears which act as mobile phase adjusting components 62*d* as well as a lever 106*c* to be used in order to adjust the phase of the mobile planet gears 62*d* relative to the rest of the phase adjustment mechanism 18*d*. The mobile planet gears 62*d* engage a ring of the counter-rotating double annular gear 138 in addition to an axial mounted phase adjustment sun gear 130.

The static phase adjustor includes 136 two or more planet gears 58*d* that are fixed to their respective positions as well as a device mount 142 which is used to affix the static phase adjustor 136 to a non displayed surface. The static planet gears 58*d* engage the remaining ring of the counter-rotating double annular gear 138 as well as the axial mounted sun gear 140.

Figure 9:
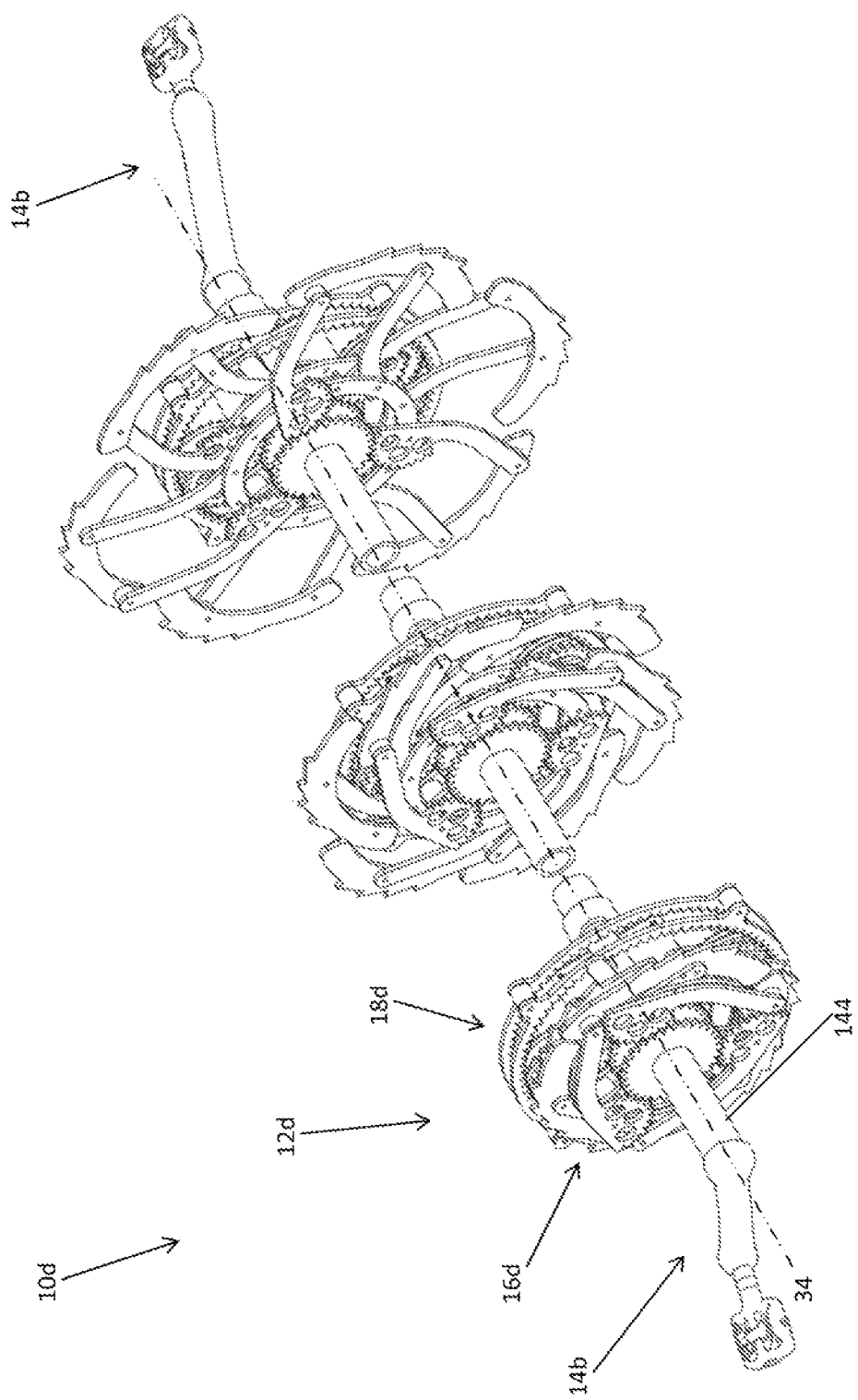
FIG. 9 is a perspective view from the left of the variable transmission according to a fourth embodiment of the invention, displaying 3 sizes of an effective cog.

Referring now to FIGS. 9 and 10 of the accompanying drawings, in use, the variable transmission 12*d* can alter the size of an effective cog size altering gear ratios without disengaging a looped elongate member, or drive chain. When a user drives pedal assemblies 14*a, b* clockwise at a given rate, for purposes of this disclosure the rate 100 rotations per minute will be used (hereafter: 100 rpm) the axial mounted sun gears 132, 140 being fixed to the axle are also rotated clockwise at 100 rpms. The fixed motor sun gear 140 drives the annular gear 138 through fixed planet gears 58*d*, resulting in a counterclockwise rotation of 138 at a ratio depending upon the relative tooth counts of 140 and 138. The mobile planet gears 62*d*, driven by counter rotating annular gear 138, in turn drive the transmission mounted sun gear 130 clockwise at 100 rpm, matching the rotation of the axle.

When a user alters the orientation of the mobile phase adjustor's 134 lever 106*c* the mobile planet gears 62*d* alter the angle or phase of the sun gear 130, which in turn alters the transmission mounted phase adjustment sun gear's 130 orientation or phase in relation to the axle, which forces the teeth of the pair of fixed motor sun gears 132 to turn the six transmission mechanism adjustor pieces 24*e* thereby altering the size of the effective cog of the variable transmission 12*d*.

Figure 13:
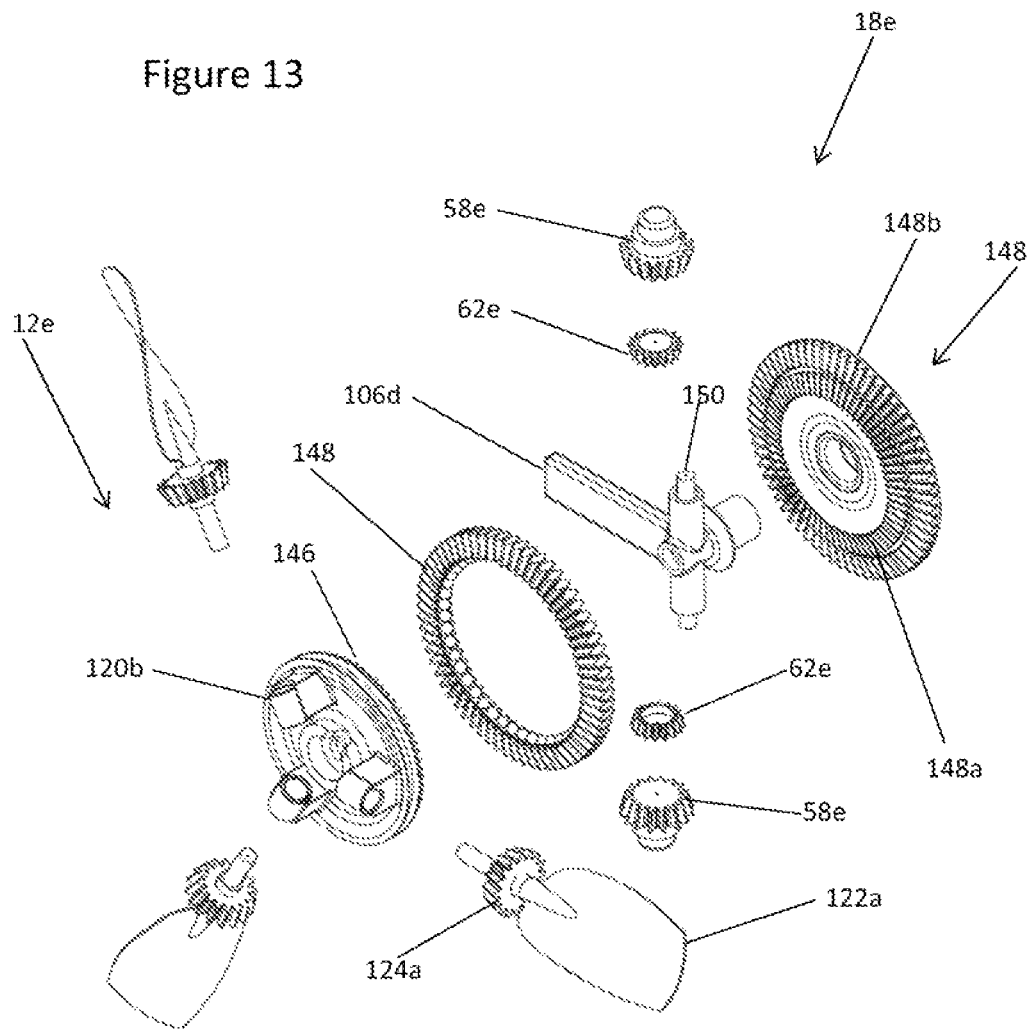
FIG. 13 is an exploded view from the left of an airplane subassembly including a propeller mechanism, components of a phase adjustment mechanism of a variable transmission, according to a fifth embodiment of the invention.
Figure 14:
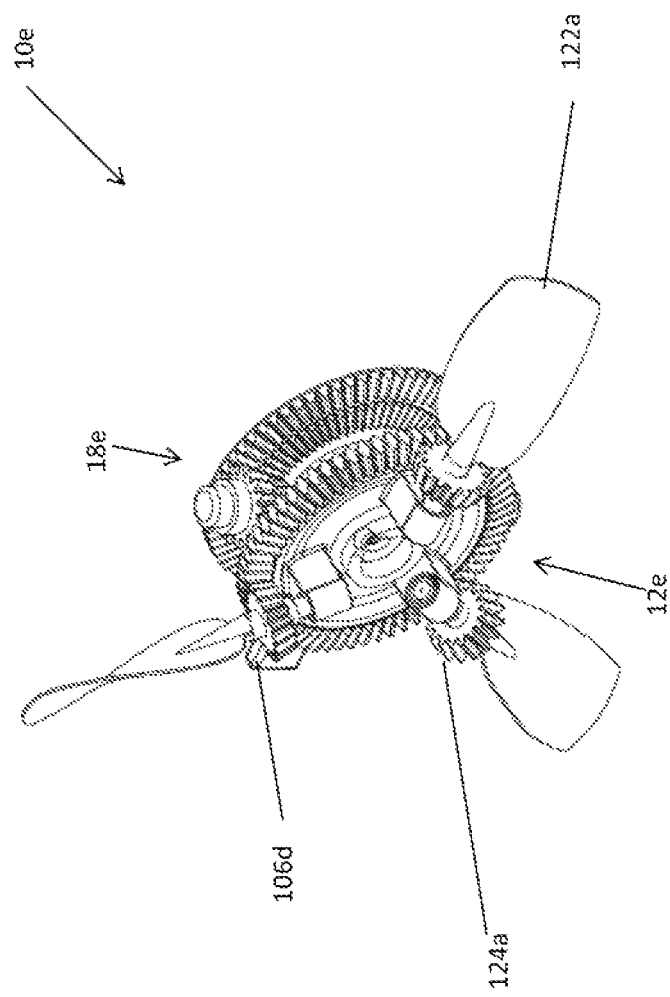
FIG. 14 is an assembled perspective view from the left of an airplane subassembly including a propeller mechanism, components of a phase adjustment mechanism of a variable transmission of FIG. 12.

FIGS. 13 and 14 of the accompanying drawings illustrate a second airplane subassembly 10*e* including a variable transmission 12*e*, and a phase adjustment mechanism 18*e*.

Referring to FIG. 14 of the accompanying drawings, the variable transmission 12*e* includes propellers 122*a*, propeller mechanism pinion gears 124*a*, propeller mounts 120*b*, an inner phase adjustment crown gear 146, and an outer drive gear 148.

The propeller mechanism pinion gears 124*a* engage with the outer drive gear 148, and the propeller mounts 120*b* position the propellers 122*a* radially outwards. The outer drive gear 148 includes bearings on its inner circumference in order to rotate freely about the inner phase adjustment crown gear 146.

The phase adjustment mechanism 18*e* includes a double crown gear 148, having an inner 148*a* and outer 148*b* set of teeth, a lever mechanism 106*d*, having pinion mounts 150, two mobile pinion gears 62*e*, and two static pinion gears 58*e*.

The mobile pinion gears 62*e* at positioned on the pinion mounts 150 and engage both the inner crown gear teeth 148*a* and an inner phase adjustment crown gear 146. The static pinion gears 58*e* are mounted to an exterior non-displayed feature and engage the outer crown gear teeth 148*b* as well as the outer drive gear 148.

In use, a force is applied to the propellers 122*a* or the axle upon which they are mounted. If the axle with propellers turns clockwise at 100 rpm, this forces the mobile 62*e* pinion gears to rotate additionally, forcing the back gear 148 to rotate counter clockwise direction at 100 rpm. The mobile phase adjustor pinions 58*e* then force the annular gear 148 to rotate at the same 100 rpm clockwise as the axle mounted assembly 120*b*. Until the lever 106*d* is repositioned, the propeller mechanism pinion gears 124*a* do not rotate relative to the axle. Once the lever 106*d* is angled at a different orientation, the mobile pinion gears 62*e* are also repositioned, altering the angle of the inner phase adjustment crown gear's 146 phase forcing the propeller mechanism pinion gears 124*a* to rotate altering the transmission of the propeller blades 122*a*.

Figure 15:
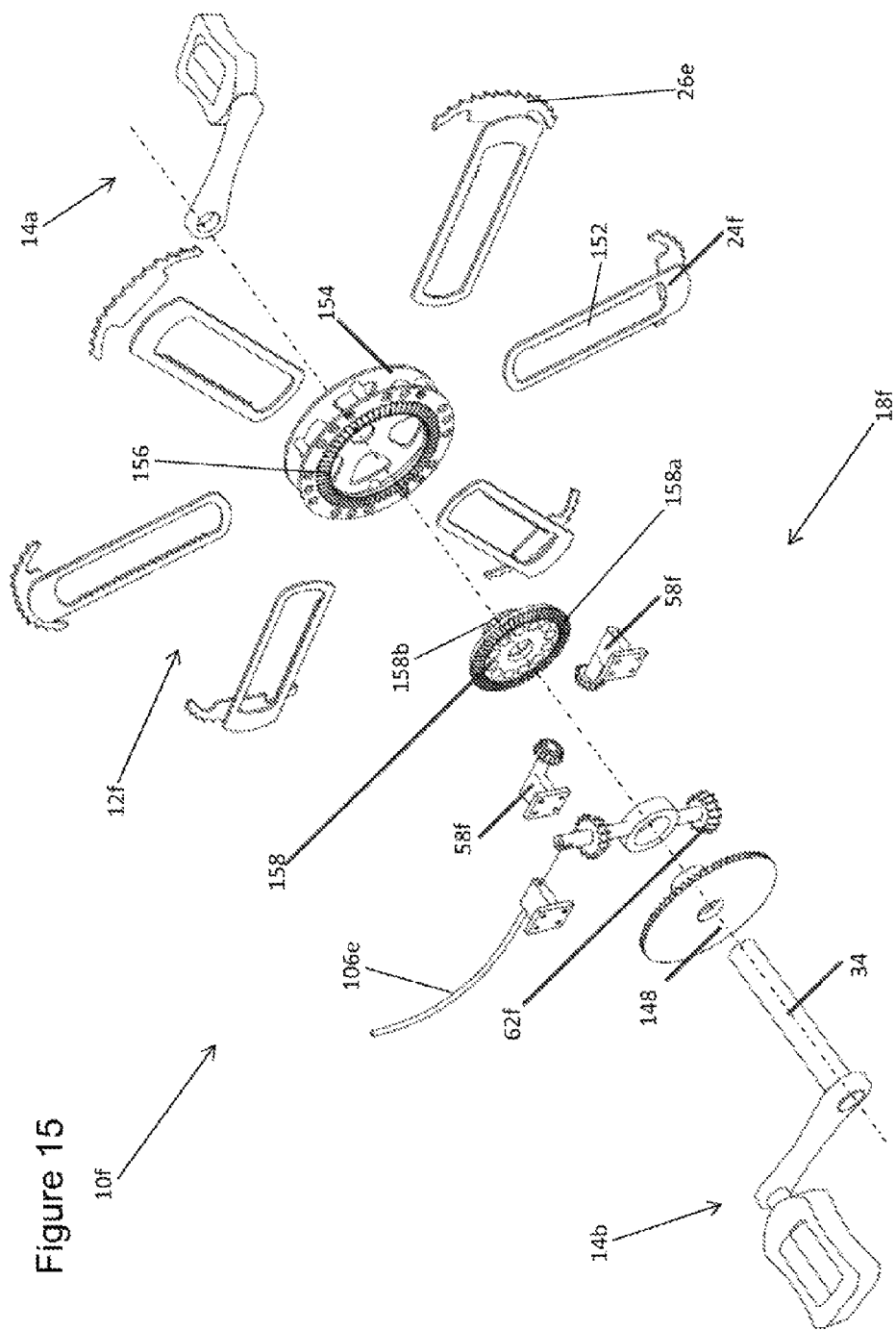
FIG. 15 is an exploded view from the right of a continuous variable transmission according to a sixth embodiment of the invention.
Figure 16:
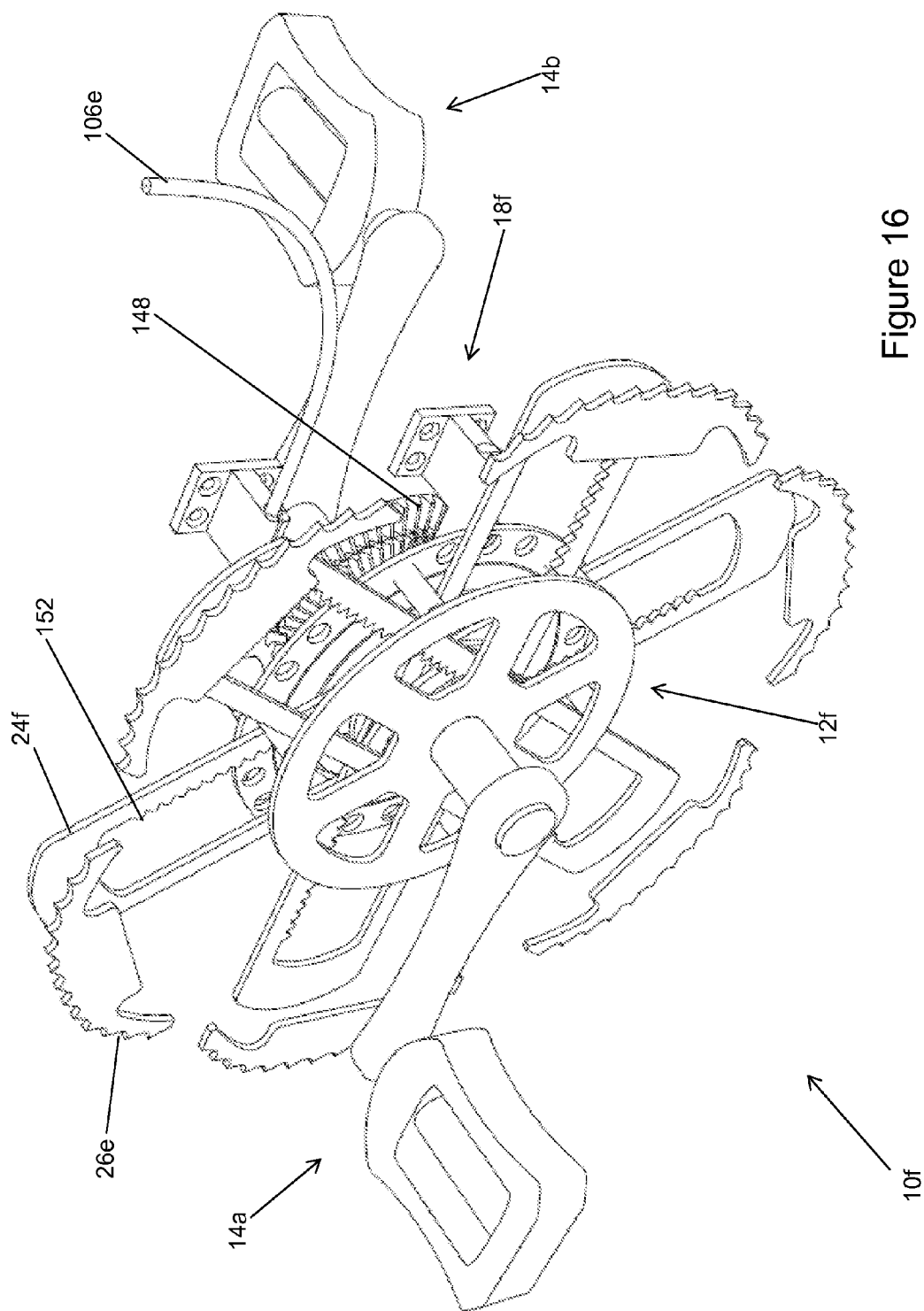
FIG. 16 is an isometric view from the left of a continuous variable transmission of FIG. 15 in a maximum cog size configuration.

FIGS. 15 and 16 of the accompanying drawings illustrate an additional alternate bicycle subassembly 10*f* including pedal assemblies 14*a* and *b*, a variable transmission 12*f*, and a phase adjustment mechanism 18*f*.

Referring to FIG. 15 of the accompanying drawings, the variable transmission 12*f* includes six transmission mechanism supports 26*e* affixed to the ends of six adjuster arms 24*f*, each having a rack gear edge 152, a hub 154 affixed to the axle 34 incorporating a hub annular gear 156 and a rotating element 158 having an annular gear edge 158*a* and a pinion gear edge 158*b*.

Figure 17:
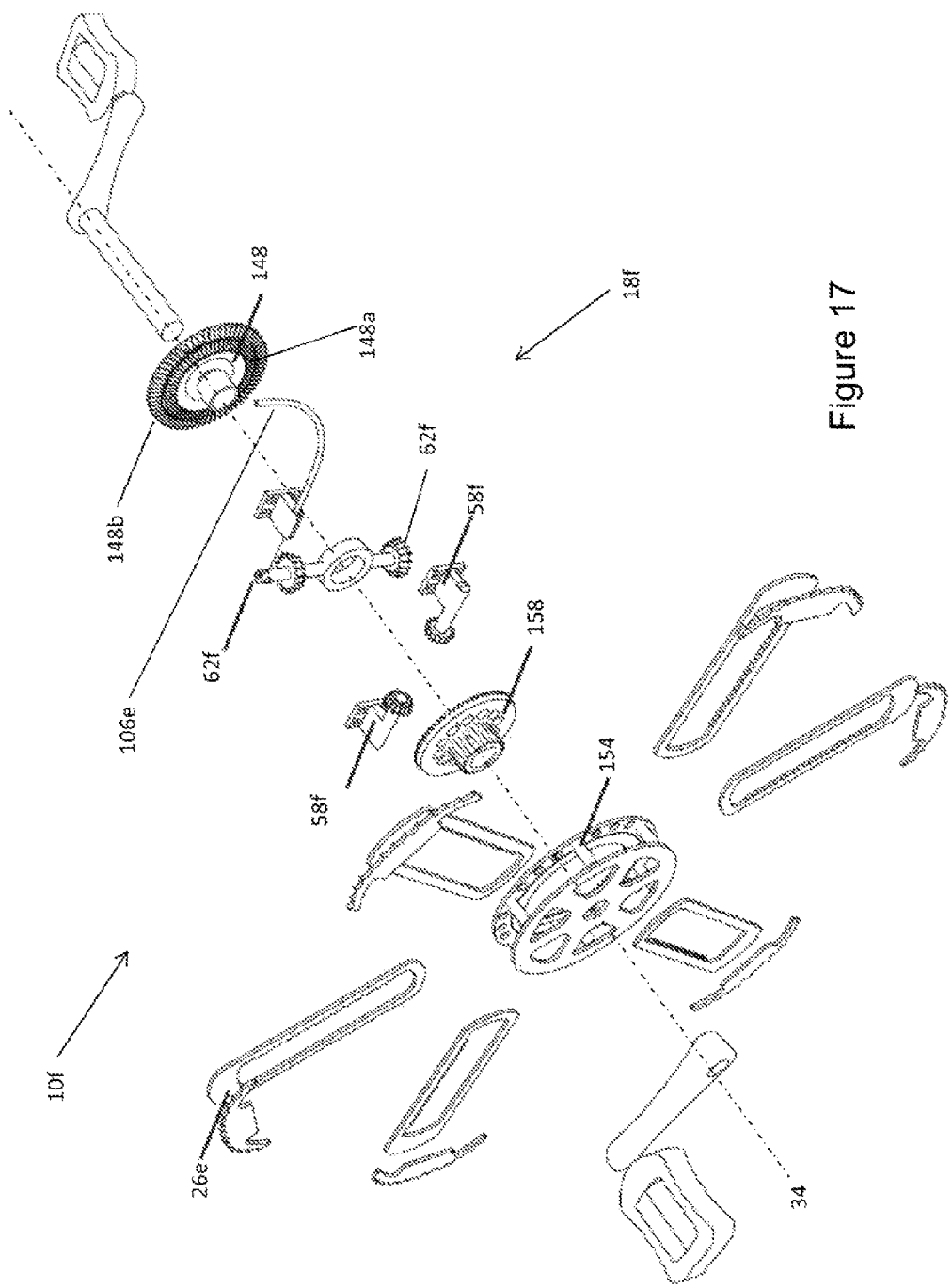
FIG. 17 is an exploded view from the left of the variable transmission of FIG. 15.

Referring to FIG. 17 of the accompanying drawings, the phase adjustment mechanism 18*f* includes twin static phase adjusting pinions 58*f*, twin mobile phase adjustment pinions 62*f*, an adjustment wire 106*e*, and a mobile double annular gear having inner teeth 148*a* and outer teeth 148*b*.

Referring to FIGS. 15, 16, and 17 of the accompanying drawings the bicycle subassembly 10*f* pieces together as follows; the pedal assemblies 14*a* and 14*b* affix to an axle 34 to which the hub 154 is also affixed; the hub annular gear 156 engages to both mobile phase adjustment pinions 62*f* which additionally engage outer teeth 148*b* of the double annular gear 148 as well as being affixed to an adjustment wire 106*e* which can alter the orientation of the mobile pinions 62*f*; the double annular gear 148 which rotates freely about the axle 34, having inner teeth 148*a* engage both static phase adjustment pinions 58*f*, which are affixed to an outside fixture such as the frame of a bicycle; the static phase adjustment pinions 58*f* additionally engage the annular gear edge 158*a* of the rotating element 158; and the rotating element 158 having a pinion gear edge 158*b* which engages each of the six rack gear edges 152 of the six adjuster arms 24*f* which slot into the hub 154 affixed to the axle.

In use, a force is applied to the axle 34. If the axle 34 is turned clockwise at 100 rpm the hub 154 additionally rotates at this speed forcing the slotted in adjuster arms 24*f* with transmission mechanism supports 26*e* to rotate simultaneously carrying a chain, for example a roller chain 39 for a bicycle with it. When a force is applied to the adjustment wire 106*e*, the relative angle of the mobile phase adjustment pinions 62*f* is altered, forcing the alteration of the relative angle in a chain action to the double annular gear 148 to the static phase adjustment pinions 58*f* to the rotating element 158 forcing the extension or retraction of the adjuster arms 24*f* to alter the size of the effective cog.

Figure 18:
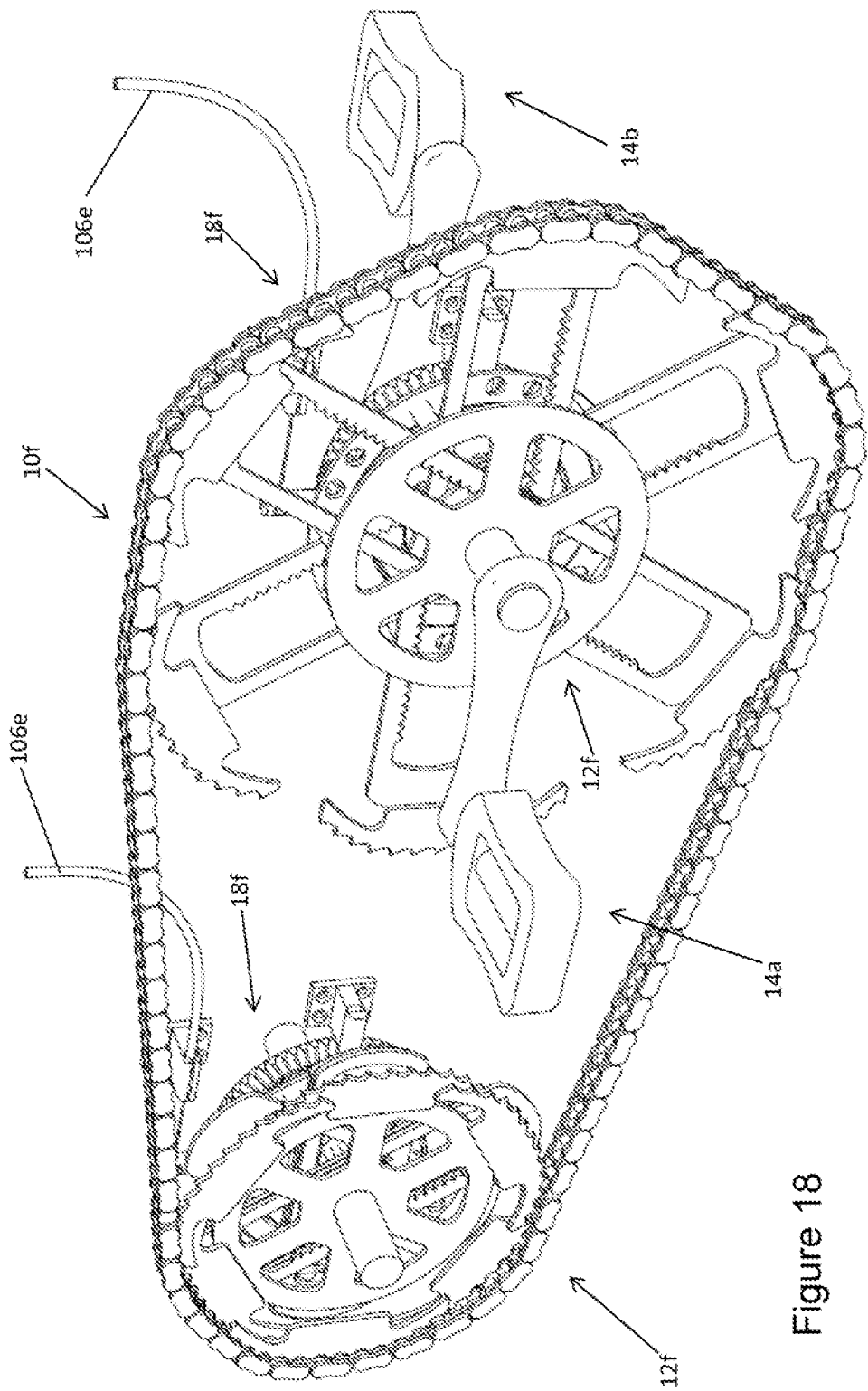
FIG. 18 is an isometric view from the left of the continuous variable transmission of FIG. 15 configured to receive a roller chain in conjunction with a second transmission, such as for a bicycle.

Referring to FIG. 18 of the accompanying drawings, two separate sets of variable transmissions and phases adjustment mechanisms can be combined to create a multiplicity of gear ratios to accommodate for example various grades of terrain on a bicycle.

Figure 19:
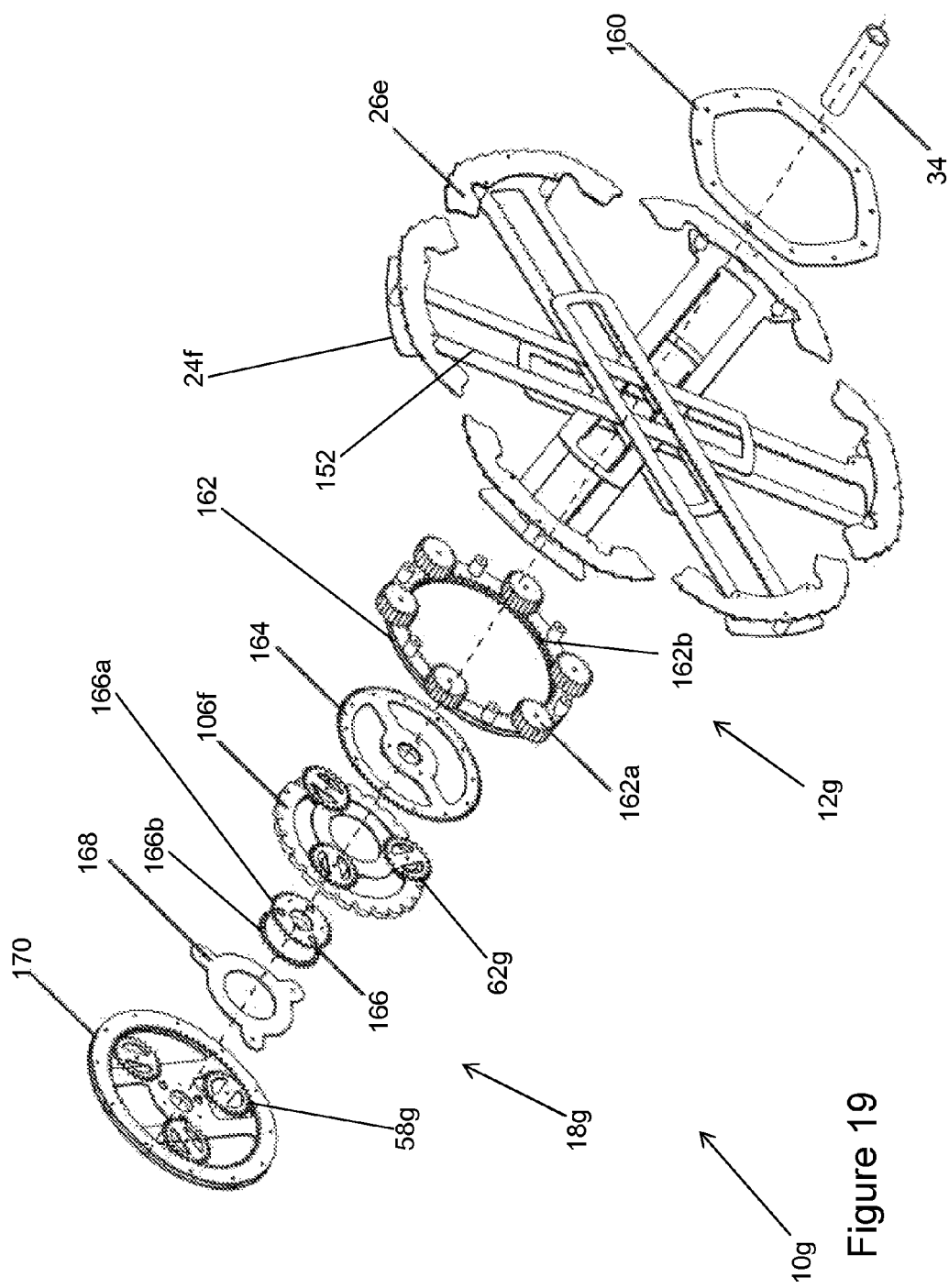
FIG. 19 is an exploded view of a continuous variable transmission according to a seventh configuration of the invention.

FIG. 19 of the accompanying drawings illustrates a still additional bicycle subassembly 10g that includes pedal assemblies 14a and 14b (not shown), a variable transmission 12g, and a phase adjustment mechanism 18g.

The variable transmission 12g includes six transmission mechanism supports 26e affixed to the ends of six adjuster arms 24f, each having a rack gear edge 152, wherein the adjuster arms 24f are held between a face plate 160 and a annular, spur gear array 162 having spur gears 162a and a set of inner annular gear teeth 162b, the spur gears 162a finally engaged with a center drive gear 164 affixed to the axle 34.

The phase adjustment mechanism 18g includes a set of mobile adjustment planet gears 62g, a set of static adjustment planet gears 58g, an adjustment gear 106f, a double sun gear 166, having front teeth 166a and rear teeth 166b, a static planet gear support 168, and an axle mounted annular gear 170.

Figure 20:
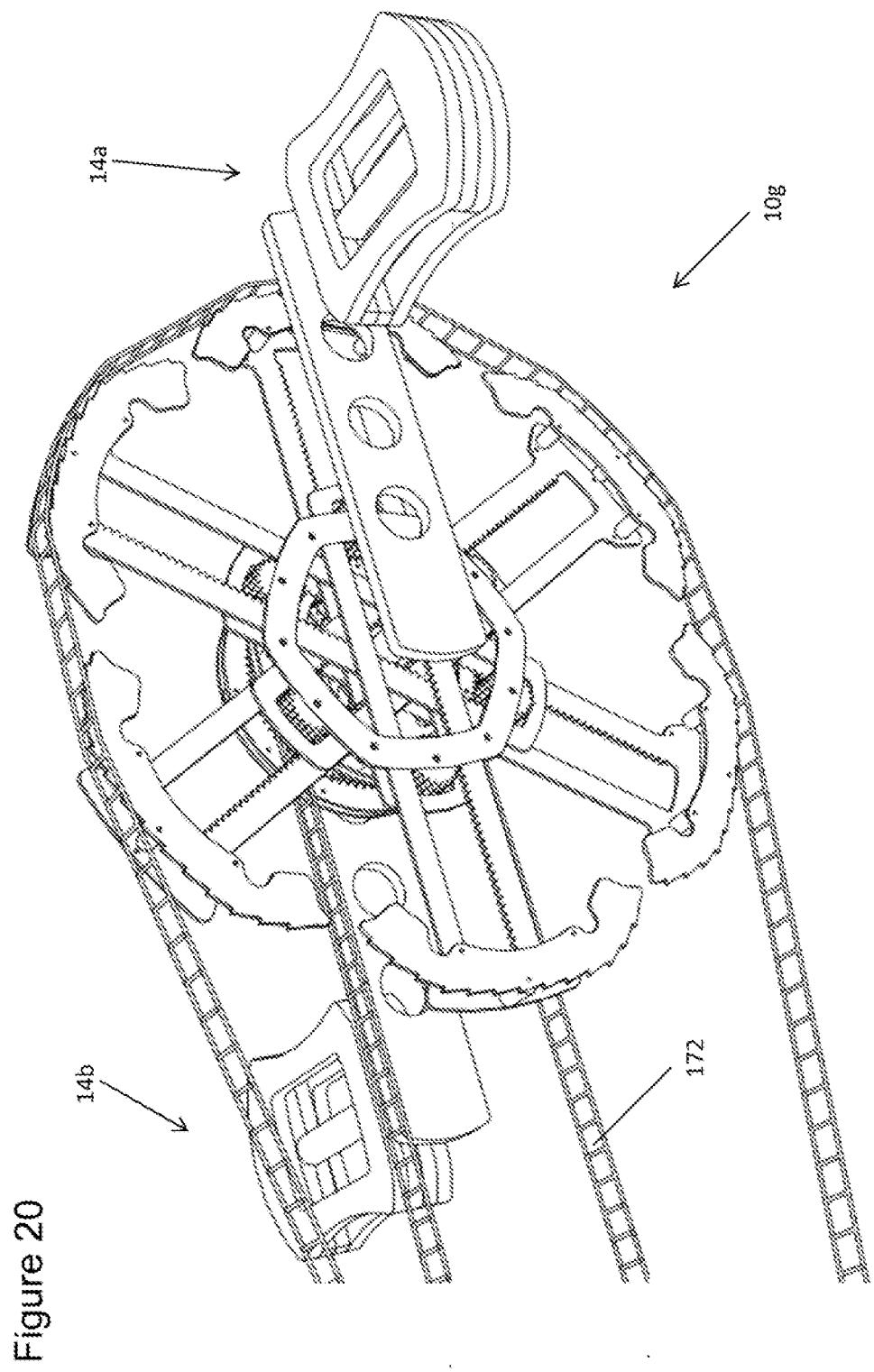
FIG. 20 is an isometric view from the left of a continuous variable transmission of FIG. 19 in a maximum cog size configuration.

Referring to FIGS. 19 and 20 of the accompanying drawings, the bicycle subassembly 10g pieces together as follows; the pedal assemblies 14a and b affix to an axle 34; affixed to the axle 34 are a center drive gear 164 and an axle mounted annular gear 170; the Axle mounted annular gear 170 is engaged with a set of static planet gears 58g, which are affixed to an outside fixture such as the frame of a bicycle via a static planet gear support 168; the static planet gears 58g engage a double sun gear's 166 rear set of teeth 166b, while the front set of teeth 166a of the double sun gear 166 engage a set of mobile adjustment planet gears 62g; the mobile adjustment planet gears 62g are affixed to an adjustment gear 106e which in turn receives an adjustment chain 172; the mobile adjustment planet gears 62g additionally engage a set of inner annular gear teeth 162b of an annular, spur gear array 162; the six spur gears 162a of the annular, spur gear array 162 engage each of the six rack gear edges 152 of the six adjuster arms 24f, additionally the six spur gears 162a engage the center drive gear 164, which is, as noted previously, affixed to the axle 34.

In certain use cases, a force may be applied to the axle 34, wherein if the axle 34 is turned clockwise at 100 rpm, the center drive gear 164 will additionally rotate at this speed and force the spur array 166 engaged with the adjuster arms 24f with transmission mechanism supports 26e to rotate simultaneously carrying a chain, for example a roller chain 39 for a bicycle with it. When the adjustment chain 172 drives the adjustment gear 106f, the relative angle of the mobile adjustment planet gears 62f affixed thereto is altered, forcing the alteration of the relative angle in a chain action to the double sun gear 166 to the static adjustment planet gears 58f to axle affixed annular gear 170, which forces the six spur gears 166 to rotate and cause the extension or retraction of the adjuster arms 24f altering the size of the effective cog.

Figure 21:
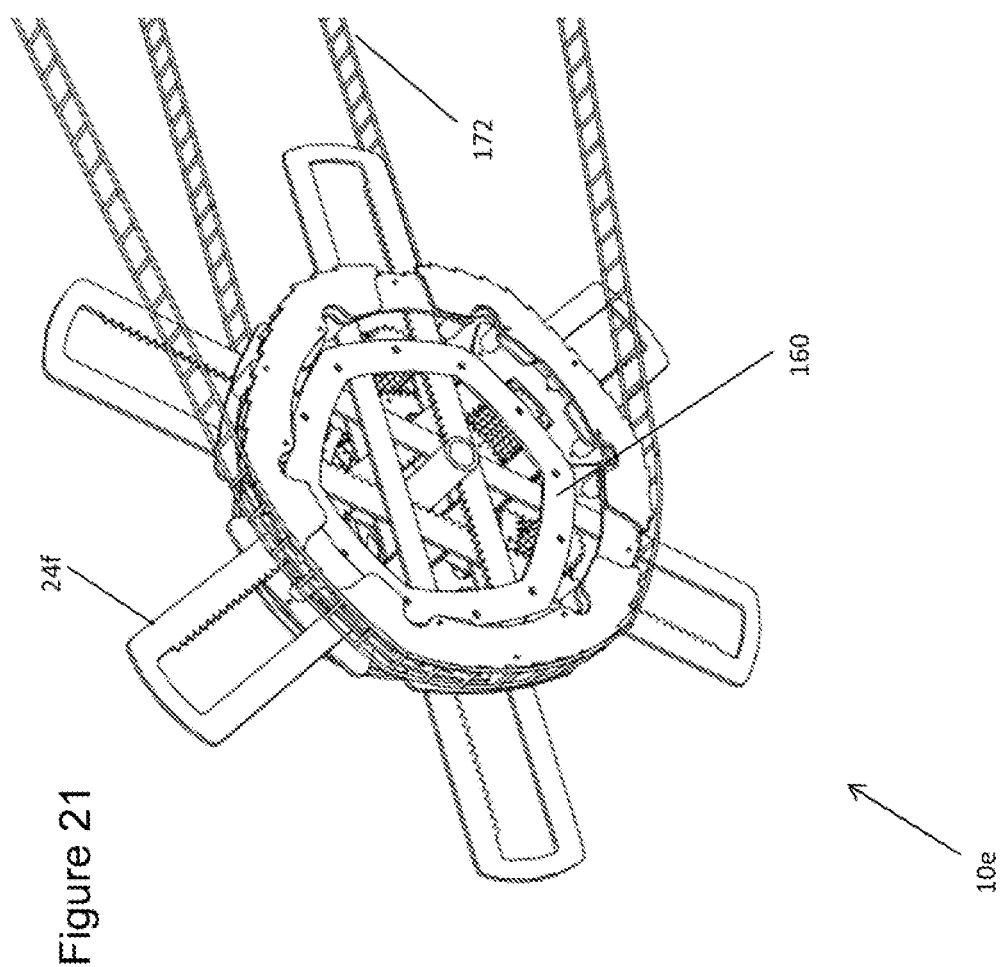
FIG. 21 is an isometric view from the left of a continuous variable transmission of FIG. 19 in a minimum cog size configuration.

Referring now to FIGS. 20 and 21, the bicycle subassembly 10e is shown in both a maximum and a minimum effective cog size and when two such sets are positioned together a multiplicity of gear ratios can be obtained in order to perform work in a user favorable manner.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed:

1. A phase adjustment mechanism comprising:
   first and second phase adjustor mounting pieces that are mounted to one another for adjustment relative to one another about a central axis through an adjustment angle;
   a first phase adjustor connecting component and a first phase adjustor connecting member respectively mounted to the first and second phase adjustor mounting pieces for rotation respectively about a first phase adjustor component axis and a first phase adjustor connecting member axis that are different than the central axis;
   first, second and third phase adjustor rotational members connected such that a train is created sequentially by the first phase adjustor rotational member, the first phase adjustor connecting component, the second phase adjustor rotational member, the first phase adjustor connecting member and the third phase adjustor rotational member and such that the first and third phase adjustor rotational members revolve in an opposite direction than the second phase adjustor rotational member, the adjustment of the phase adjustor mounting pieces relative to one another through the adjustment angle causing a phase adjustment between the first and third phase adjustor rotational members.

2. The phase adjustment mechanism of claim 1 wherein the second phase adjustor mounting piece extends through the second phase adjustor rotational member.

3. The phase adjustment mechanism of claim 1 further comprising a plurality of phase adjustor connecting components, each being mounted to the first phase adjustor mounting piece.

4. The phase adjustment mechanism of claim 3 wherein each phase adjustor component axis intersects the central axis.

5. The phase adjustment mechanism of any one of claim 1 further comprising a plurality of phase adjustor connecting members, each being mounted to the second phase adjustor mounting piece for rotation about a respective phase adjustor connecting member axis, the phase adjustor connecting member axis being different from one another and different than the central axis.

6. The phase adjustment mechanism of claim 5 wherein each phase adjustor connecting member axis intersects the central axis.

7. The phase adjustment mechanism of any one of claim 1 wherein the first phase adjustor component, first phase adjustor connecting member, and first, second and third phase adjustor rotational members have meshing teeth.

8. The phase adjustment mechanism of claim 7 wherein the first phase adjustor component and the first phase adjustor connecting member have the same number of teeth.

9. The phase adjustment mechanism of any one of claim 1 wherein the first, second and third phase adjustor rotational members revolve about the central axis.

10. The phase adjustment mechanism of claim 9 wherein the third phase adjustor rotational member forms part of a phase adjustor subsystem that rotates in the same direction as the first phase adjustor rotational member, the first phase adjustor rotational member and at least a portion of the phase adjustor subsystem being located to the left of the second phase adjustor rotational member.

11. The phase adjustment mechanism of claim 10 wherein the first and third phase adjustor rotational members are located to the left of the second phase adjustor rotational member.

12. The phase adjustment mechanism of claim 11 wherein the first phase adjustor component and the first phase adjustor connecting member contact the same side of the second phase adjustor rotational member.

13. The phase adjustment mechanism of claim 11 further comprising a phase adjustor shaft secured to the third phase adjustor rotational member, the second phase adjustor mounting piece being located on the phase adjustor shaft and rotatable on the phase adjustor shaft.

14. The phase adjustment mechanism of claim 10 wherein the first and third phase adjustor rotational members are on opposite sides of the second phase adjustor rotational member.

15. The phase adjustment mechanism of claim 14 wherein the first phase adjustor component and first phase adjustor connecting member contact opposite sides of the second phase adjustor rotational member.

16. The phase adjustment mechanism of claim 15 further comprising a phase adjustor return shaft connected to the third phase adjustor rotational member and extending from the third phase adjustor rotational member through the second and first phase adjustor rotational members.

17. The phase adjustment mechanism of claim 16 wherein the second phase adjustor mounting piece is located on the phase adjustor return shaft and rotatable on the phase adjustor return shaft.

18. A variable transmission comprising:
  a transmission mechanism including:
    a transmission mechanism mounting piece;
    a plurality of transmission mechanism adjustor pieces, each being mounted about a central axis to the transmission mechanism mounting piece for rotation about a respective transmission mechanism adjustor piece axis and each having an outer edge defining an arc about a respective transmission mechanism adjustor piece axis;
    a plurality of eccentric transmission mechanism supports, each being mounted to a respective one of the transmission mechanism adjustor piece at a location that is offset from the respective transmission mechanism adjustor piece axis so that rotation of the respective transmission mechanism adjustor piece causes rotation of the transmission mechanism support toward the central axis, each transmission mechanism support having an outer surface for supporting a looped elongate member running over the surfaces of consecutive ones of the transmission mechanism supports;
  a phase adjustment mechanism comprising:
    first and second phase adjustor mounting pieces that are mounted to one another for adjustment relative to one another about a central axis through an adjustment angle;
    a first phase adjustor connecting component and a first phase adjustor connecting member respectively mounted to the first and second phase adjustor mounting pieces for rotation respectively about a first phase adjustor component axis and a first phase adjustor connecting member axis that are different than the central axis;
    first, second and third phase adjustor rotational members connected such that a train is created sequentially by the first phase adjustor rotational member, the first phase adjustor connecting component, the second phase adjustor rotational member, the first phase adjustor connecting member and the third phase adjustor rotational member and such that the first and third phase adjustor rotational members revolve in an opposite direction than the second phase adjustor rotational member, the adjustment of the phase adjustor mounting pieces relative to one another through the adjustment angle causing a phase adjustment between the first and third phase adjustor rotational members; and
  a link member secured to the phase adjustment mechanism, the link member having surface contacting the outer edges of the transmission mechanism adjustor pieces and the phase adjustment mechanism being secured to the transmission mechanism mounting piece so that phase adjustment of the first phase adjustor rotational member relative to the third phase adjustor rotational member causes rotation of the transmission mechanism adjustor pieces relative to the transmission mechanism mounting piece.

19. An airplane assembly comprising:
  a phase adjustment mechanism including:
  first and second phase adjustor mounting pieces that are mounted to one another for adjustment relative to one another about a central axis through an adjustment angle;
  a first phase adjustor connecting component and a first phase adjustor connecting member respectively mounted to the first and second phase adjustor mounting pieces for rotation respectively about a first phase adjustor component axis and a first phase adjustor connecting member axis that are different than the central axis;
  first, second and third phase adjustor rotational members connected such that a train is created sequentially by the first phase adjustor rotational member, the first phase adjustor connecting component, the second phase adjustor rotational member, the first phase adjustor connecting member and the third phase adjustor rotational member and such that the first and third phase adjustor rotational members revolve in an opposite direction than the second phase adjustor rotational member, the adjustment of the phase adjustor mounting pieces relative to one another through the adjustment angle causing a phase adjustment between the first and third phase adjustor rotational members; and
  a propeller mechanism including:
    a propeller mount that rotates about a central axis; and
    at least one propeller mounted to the propeller mount for rotation together with the propeller mount about the central axis and relative to the propeller mount about an axis at right angles to the central axis, wherein the phase adjustment by the phase adjustment mechanism rotates the propeller relative to the propeller mount.

* * * * *